United States Patent
Zhao et al.

(10) Patent No.: US 11,092,709 B2
(45) Date of Patent: Aug. 17, 2021

(54) USE OF WAVELET CROSS-CORRELATION FOR VIRTUAL SOURCE DENOISING

(71) Applicant: Saudi Arabian Oil Company, Dhahran (SA)

(72) Inventors: Yang Zhao, Katy, TX (US); Weichang Li, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 462 days.

(21) Appl. No.: 15/809,744

(22) Filed: Nov. 10, 2017

(65) Prior Publication Data
US 2018/0136353 A1    May 17, 2018

Related U.S. Application Data

(60) Provisional application No. 62/423,401, filed on Nov. 17, 2016.

(51) Int. Cl.
| | | |
|---|---|---|
| G01V 1/36 | (2006.01) | |
| G01V 1/32 | (2006.01) | |
| G01V 1/28 | (2006.01) | |

(52) U.S. Cl.
CPC ............ *G01V 1/366* (2013.01); *G01V 1/28* (2013.01); *G01V 1/32* (2013.01); *G01V 1/36* (2013.01);
(Continued)

(58) Field of Classification Search
CPC . G01V 1/366; G01V 1/28; G01V 1/36; G01V 1/32; G01V 2210/57;
(Continued)

(56) References Cited

U.S. PATENT DOCUMENTS

| | | | |
|---|---|---|---|
| 5,287,328 A | 2/1994 | Anderson et al. | |
| 7,616,524 B1* | 11/2009 | Gersztenkorn | .......... G01V 1/30 367/38 |

(Continued)

FOREIGN PATENT DOCUMENTS

| | | |
|---|---|---|
| CN | 102707314 | 10/2012 |
| CN | 102749648 | 10/2012 |

(Continued)

OTHER PUBLICATIONS

Gulf Cooperation Council Examination Report issued in GCC Application No. GC 2018-34663 on Dec. 2, 2019, 4 pages.
(Continued)

*Primary Examiner* — Raymond L Nimox
(74) *Attorney, Agent, or Firm* — Fish & Richardson P.C.

(57) ABSTRACT

Seismic shot gather data is received from a computer data store for processing. The received seismic shot gather data is separated into downgoing and upgoing wavefields, a time-frequency-wavenumber (t-f-k) three-dimensional (3D) data cube comprising multiple time-frequency (t-f) slices is formed. The downgoing wavefields are wavelet transformed from a time (t) domain to a t-f domain and the upgoing wavefields are wavelet transformed from the t domain to the t-f domain. A wavelet cross-correlation is performed between the downgoing wavefields in the t-f domain and the upgoing wavefields in a t-f-k domain to generate wavelet cross-correlated data. Soft-threshold filtering if performed for each t-f slice of the t-f-k 3D data cube. An inverse wavelet transform is performed to bring wavelet cross-correlated data from the t-f-k domain to a time-receiver (t-x) domain. All seismic shots of the received seismic shot gather data are looped over and the wavelet cross-correlated data is stacked as a virtual source gather.

20 Claims, 16 Drawing Sheets
(6 of 16 Drawing Sheet(s) Filed in Color)

(52) U.S. Cl.
CPC .... *G01V 2210/23* (2013.01); *G01V 2210/242* (2013.01); *G01V 2210/25* (2013.01); *G01V 2210/26* (2013.01); *G01V 2210/44* (2013.01); *G01V 2210/48* (2013.01); *G01V 2210/57* (2013.01)

(58) Field of Classification Search
CPC ........... G01V 2210/23; G01V 2210/25; G01V 2210/26; G01V 2210/242; G01V 2210/48; G01V 2210/44
See application file for complete search history.

(56) References Cited

U.S. PATENT DOCUMENTS

| | | | |
|---|---|---|---|
| 10,345,468 B2* | 7/2019 | Poole | G01V 1/28 |
| 10,845,494 B2 | 11/2020 | Zhao et al. | |
| 2007/0064531 A1 | 3/2007 | DuBose | |
| 2011/0069581 A1* | 3/2011 | Krohn | G01V 1/364 367/43 |
| 2011/0213556 A1* | 9/2011 | Yu | G01V 1/368 702/14 |
| 2013/0033961 A1 | 2/2013 | Burnstad | |
| 2013/0194893 A1 | 8/2013 | Nagarajappa | |
| 2013/0336091 A1 | 12/2013 | Song et al. | |
| 2014/0365135 A1* | 12/2014 | Poole | G01V 1/36 702/17 |
| 2015/0316674 A1 | 11/2015 | Deschizeaux et al. | |
| 2016/0187513 A1* | 6/2016 | Poole | G01V 1/38 702/16 |
| 2016/0320509 A1* | 11/2016 | Almuhaidib | G01V 1/306 |

FOREIGN PATENT DOCUMENTS

| | | |
|---|---|---|
| CN | 102998703 | 3/2013 |
| CN | 103645507 | 3/2014 |
| CN | 104483704 | 4/2015 |
| WO | WO 2015078842 | 6/2015 |

OTHER PUBLICATIONS

Alexandrov et al., "Improving land seismic repeatability with virtual source redatuming: synthesis case study," SEG Technical Program Expanded Abstracts 2012, Sep. 2012, pp. 1-5.
Gulf Cooperation Council Examination Report issued in GCC Application No. GC2018-34663 on Jul. 28, 2019, 4 pages.
Gulf Cooperation Council Examination Report issued in GCC Application No. GC2017-34273 on Jun. 7, 2019, 4 pages.
Gulf Cooperation Council Examination Report issued in GCC Application No. GC 2017-34273 on Oct. 13, 2019, 4 pages.
Gulf Cooperation Council Examination Report issued in GCC Application No. GC 2018-34906 on Sep. 27, 2019, 5 pages.
Ling et al., "A fast SVD for multilevel block Handkel matrices with minimal memory storage," Numerical Algorithms, Amsterdam, vol. 69, No. 4, Oct. 28, 2014, 17 pages.
International Search Report and Written Opinion issued in International Application No. PCT/US2018/021081 dated Jun. 8, 2018, 15 pages.
Askari and Siahkoohi, "Ground roll attenuation using the S and x-f-k transforms," Geophysical Prospecting vol. 56, Jan. 2008, 10 pages.
Bakulin and Calvert, "Virtual Source: new method for imaging and 4D below complex overburden," SEG International Exposition and 74th Annual Meeting, Society of Exploration Geophysicists, Oct. 10-15, 2004, 4 pages.
Bakulin and Calvert, "The virtual source method: Theory and case study," Geophysics vol. 71, No. 4, Jul.-Aug. 2006, 12 pages.
Diallo et al., "Characterization of polarization attributes of seismic waves using continuous wavelet transforms," Geophysics vol. 71, No. 3, May-Jun. 2006, 12 pages.

Li and Nozaki, "Application of Wavelet Cross-Correlation Analysis to a Plane Turbulent Jet," JSME International Journal Series B, vol. 40, No. 1, Feb. 15, 1997, 9 pages.
Liu and Fomel, "Seismic data analysis using local time-frequency decomposition," Geophysical Prospecting vol. 61, Issue 3, May 2013, 21 pages.
Mallat and Zhang, "Matching Pursuits With Time-Frequency Dictionaries," IEEE Transactions on Signal Processing vol. 41, No. 12, Dec. 1993, 19 pages.
Mehta et al., "Improving the virtual source method by wavefield separation," Geophysics vol. 72, No. 4, Jul.-Aug. 2007, 9 pages.
Mehta et al., "Strengthening the virtual-source method for time-lapse monitoring," Geophysics vol. 73, No. 3, May-Jun. 2008, 8 pages.
Van der Neut et al., "Controlled-source interferometric redatuming by crosscorrelation and multidimensional deconvolution in elastic media," Geophysics vol. 76, No. 4, Jul.-Aug. 2011, 14 pages.
Wapenaar and Fokkema, "Green's function representations for seismic interferometry," Geophysics vol. 71, No. 4, Jul.-Aug. 2006, 14 pages.
Yu et al., "Wavelet-Radon domain dealiasing and interpolation of seismic data," Geophysics vol. 72, No. 2, Mar.-Apr. 2007, 9 pages.
Zhao and Burnstad, "A new virtual source redatuming procedure to improve land 4D repeatability," 2015 SEG Annual Meeting, Society of Exploration Geophysicists, Oct. 18-23, 2015, 4 pages.
Alexandrov et al., "Improving imaging and repeatability on land using virtual source redatuming with shallow buried receivers," XPo55463335, Geophysics vol. 8, No. 2, Mar. 1, 2015, 12 pages.
Cadzou, "Signal enhancement—A Composite Property Mapping Algorithm," IEEE Transactions on Acoustics, Speech and Signal Processing, vol. 36, No. 1, Jan. 1988, 14 pages.
Chen, "Robust matrix rank reduction methods for seismic data processing," Thesis for the degree of Master of Science in Geophysics, University of Alberta, Fall of 2013, 136 pages.
Halliday et al., "Interferometric ground-roll removal: Attenuation of scattered surface waves in single-sensor data," XP001553286, Geophysics, Society of Exploration Geophysicists vol. 75, No. 2, Mar. 1, 2010, 11 pages.
Pevzner et al., "Repeatability analysis of land time-lapse seismic data: CO2CRC Otway pilot project case study," Geophysical Prospecting 59, Jan. 2011, 12 pages.
Trickett et al., "Robust rank-reduction filtering for erratic noise," SEG, SEG Las Vergas 2012 Annual Meeting, Nov. 4-9, 2012, 5 pages.
Ulrych et al., "Tutorial: Signal and noise separation: Art and science," Geophysics vol. 64, No. 5, Sep.-Oct. 1999, 9 pages.
Van der Neut and Bakulin, "Estimating and correcting the amplitude radiation pattern of a virtual source," Geophysics 74(2), Mar.-Apr. 2009, 10 pages.
International Search Report and Written Opinion issued in International Application No. PCT/US2018/015537 dated May 3, 2018, 16 pages.
Van der Neut, "Interferometric redatuming by multidimensional deconvolution," Thesis for the degree of Master of Applied Geophysics, Technische Universiteit Delft, Dec. 17, 2012, 295 pages.
International Search Report and Written Opinion in International Application No. PCT/US2017/061452 dated Apr. 9, 2018, 16 pages.
GCC Examination Report in GCC Appln. No. GC 2018-34906, dated Jan. 25, 2020, 4 pages.
Zhao et al., "Virtual-source imaging and repeatability for complex near surface," Sci Rep. 2019;9(1):16656. Published Nov. 13, 2019. doi:10.1038/s41598-019-53146-w (Year: 2019), 18 pages.
wikipedia.org (online), "Hankel matrix," retrieved on Oct. 4, 2020, retrieved from URL <https://eri.wikipedia.org/wiki/Harikelmatrix>, Aug. 7, 2020, 5 pages.
GCC Examination Report issued in Gulf Cooperation Council Application No. GC 2018-34906 on Jul. 17, 2020, 4 pages.
CN Office Action in Chinese Appln. No. 201780083708.X, dated Oct. 26, 2020, 18 pages (English Translation).
CN Office Action in Chinese Appln. No. 201880022609.5, dated Feb. 24, 2021, 11 pages, with English Translation.

* cited by examiner

USE OF WAVELET CROSS-CORRELATION FOR VIRTUAL SOURCE DENOISING

CROSS-REFERENCE TO RELATED APPLICATIONS

This application claims the benefit of priority to U.S. Provisional Application Ser. No. 62/423,401, filed on Nov. 17, 2016, the contents of which are hereby incorporated by reference.

BACKGROUND

Virtual source (VS) redatuming is an interferometry-based numerical method for seismic data generation and processing that can simplify recorded data by eliminating distortions associated with heterogeneities located between sources and receivers. VS redatuming cross-correlates downgoing seismic waves with corresponding upgoing seismic waves to redatum surface source records to buried receiver locations. By correlating the two paths, VS records can mitigate complexity to produce a better image of underground structures. In practice, however, the quality of VS redatuming data is degraded by at least multiples, scattering waves, and ground-roll noises.

SUMMARY

The present disclosure describes methods and systems, including computer-implemented methods, computer program products, and computer systems for the use of wavelet cross-correlation for virtual source (VS) denoising.

In an implementation, seismic shot gather data is received from a computer data store for processing. The received seismic shot gather data is separated into downgoing and upgoing wavefields, a time-frequency-wavenumber (t-f-k) three-dimensional (3D) data cube comprising multiple time-frequency (t-f) slices is formed. The downgoing wavefields are wavelet transformed from a time (t) domain to a t-f domain and the upgoing wavefields are wavelet transformed from the t domain to the t-f domain. A wavelet cross-correlation is performed between the downgoing wavefields in the t-f domain and the upgoing wavefields in a t-f-k domain to generate wavelet cross-correlated data. Soft-threshold filtering if performed for each t-f slice of the t-f-k 3D data cube. An inverse wavelet transform is performed to bring wavelet cross-correlated data from the t-f-k domain to a time-receiver (t-x) domain. All seismic shots of the received seismic shot gather data are looped over and the wavelet cross-correlated data is stacked as a virtual source gather.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations so as to realize one or more of the following advantages. First, the described method fully integrates wavelet transform, cross-correlation, non-stationary time-frequency, and time-frequency wavenumber filtering into VS). Second, the described integration explores coherence across frequency and wavenumber, as well as scale dependency at each frequency and wavenumber band, which permits better noise filtering and signal separation. Third, the described method provides a more globally-tuned adaptivity that enables, without extensive human intervention, automated processing with consistent seismic quality. Fourth, by using the described method, effective noise suppression and high-resolution separation of nonstationary signals is achieved using t-f, t-f-k, or time-frequency-spatial filtering of the wavelet correlation coefficients. Conflicting VS quality issues, such as scattering noises, residual ground-rolls, and other S-wave modes, can be addressed. Fifth, the described method effectively attenuates VS cross-talk and artifacts, and produces significantly better stack images without requiring a near-surface model—positive step towards effective seismic monitoring in land systems. Sixth, the accuracy of reservoir monitoring for seismic four-dimensional (4D) surveys can be improved. As 4D noise is mainly dominated by near-surface variation associated noises, by reducing near-surface influence to reflection signals, the described methodology can improve time lapse repeatability.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

Figure 1:
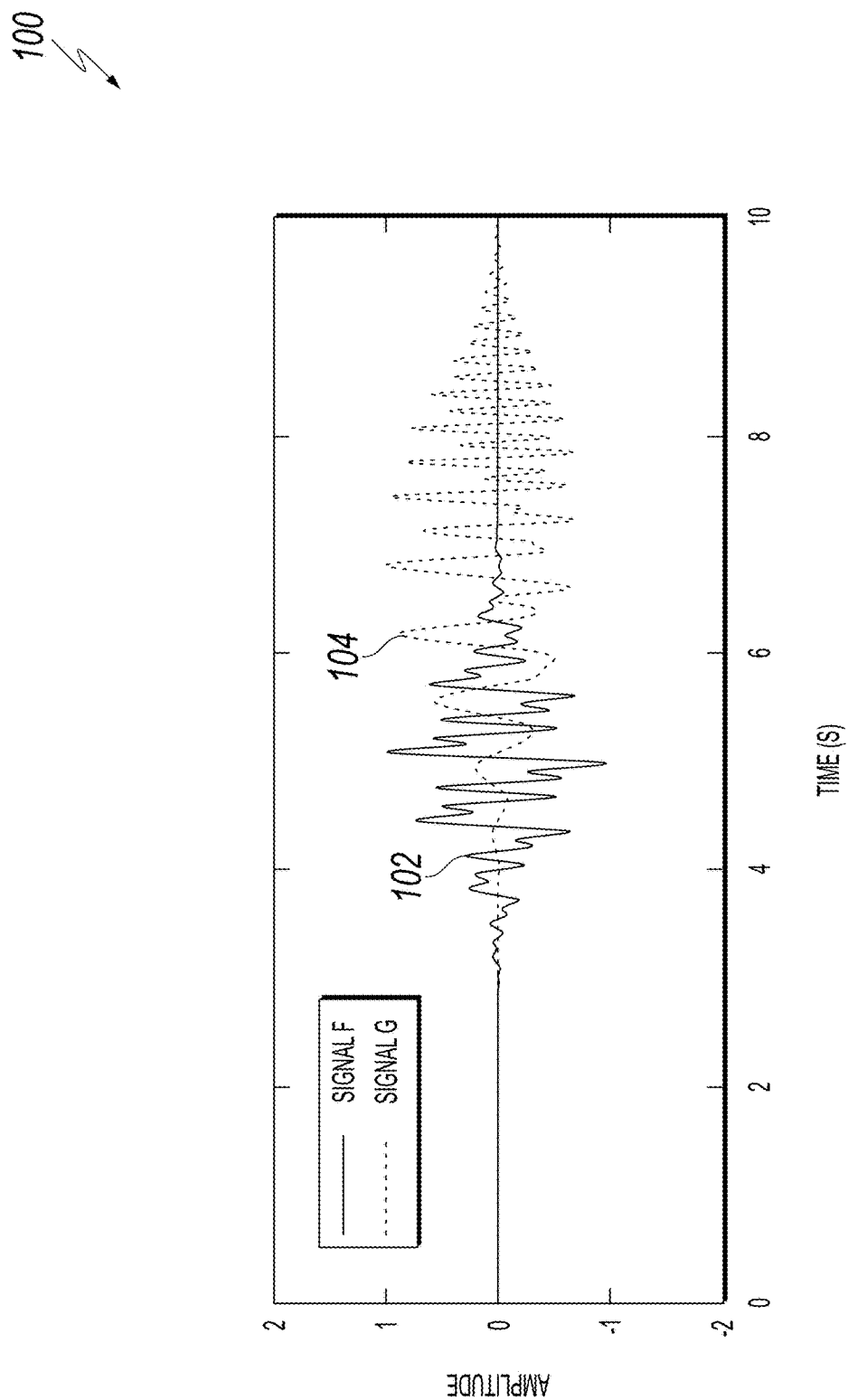
FIG. 1 is a graph illustrating a plot of two synthetic test signals, f and g, according to an implementation of the present disclosure.

The following detailed description describes the use of wavelet cross-correlation for virtual source (VS) denoising, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

VS redatuming is an interferometry-based numerical method for seismic data generation and processing that can simplify recorded data by eliminating distortions associated with heterogeneities located between sources and receivers. VS redatuming cross-correlates downgoing seismic waves with corresponding upgoing seismic waves to redatum surface source records to buried receiver locations. By correlating the two paths, VS records can mitigate complexity to produce a better image of underground structures. In practice, however, the quality of VS redatuming data can be severely degraded by a failure to address wavefield nonstationarity in cross-correlation and non-suppression of noises and cross-talk, such as multiples, scattering waves, and ground-roll noises. The degraded image quality can, in some instances, have a signal to noise ratio lower than that obtained from simply stacking seismic images.

Using isolated P energy in both upgoing and downgoing wavefields to eliminate noise and cross-talk is an imperative part of elastic VS development. However, the use of P energy in this manner also implies that the success of VS depends heavily on careful pre-processing of inputs, such as upgoing and downgoing wave separation and scattering/ground-roll noise removal. The effects of denoising during virtual source processing must also be taken into consideration.

Wavelet transform (WT) has demonstrated advantages in a wide range of applications in both engineering and image-processing. WT decomposes signal traces into time-scaled wavelet coefficients. Scale measure, which is closely related to frequency, can be used to analyze and filter data. The advantage of wavelet domain cross-correlation is the ability to characterize signal cross-coherence in a scale- or frequency-dependent manner, which is closely related to the described VS problem. The level of cross-correlation between downgoing and upgoing seismic waves, as an estimate of VS response, can be frequency-dependent due to the physics of wave propagation.

Described is a new VS redatuming method using cross-correlation in a wavelet domain that characterizes and exploits non-stationary variations of interferometric data to overcome severe noise effects. Specifically, the method maps data from a time-offset (t-x) domain into a time-frequency (t-f) or time-frequency-wavenumber (t-f-k) domain. An original phase is maintained but spectra are filtered to remove VS cross-talk and to suppress noise effects. The new method involves forward wavelet transforming data, cross-correlation of coefficients, filtering, and inverse wavelet transformation.

By using the described wavelet cross-correlation method, effective noise suppression and high-resolution separation of nonstationary signals is achieved using t-f, t-f-k, or time-frequency-spatial filtering of the wavelet correlation coefficients. Conflicting VS quality issues, such as scattering noises, residual ground-rolls, and other S-wave modes, can be addressed. The technique effectively attenuates VS cross-talk and artifacts, and produces significantly better stack images without requiring a near-surface model. Not requiring a near-surface model is a positive step towards effective seismic monitoring in land systems.

The described methodology and related t-f and t-f-k filtering can be used in signal processing, for example electrical engineering, medical imaging, and well-logging denoising. As long as the correlation process is frequency-dependent, the described methodology provides higher-dimensions to better separate signals and noise. The output of the described methodology can be output to other seismic processing flows (for example, a pre-stack time depth migration) for use in other processing.

Virtual sources in shallow depth on land.

VS involves cross-correlation of two-way wave fields and summation over the contributing sources. Specifically, $$V(r_B \mid r_A) \approx \sum_{src} \begin{bmatrix} D_P(r_A \mid r_S; t) \\ + \\ D_M(r_A \mid r_S; t) \\ \cdots \end{bmatrix} \times \begin{bmatrix} U_P(r_B \mid r_S; t) \\ + \\ U_M(r_B \mid r_S; t) \\ + \\ U_S(r_B \mid r_S; t) \end{bmatrix}, \quad (1)$$

where x and * denote temporal cross-correlation and convolution, respectively. $r_A$, $r_B$ and $r_S$ denote the spatial coordinates of the two receivers at A, B and the source location. $V(r_B \mid r_A)$ is the interferometric data recorded in receiver $r_B$ when $r_A$ is treated as a virtual source. The left column in the summation represents downgoing direct wavefield received by shallow buried sensors at near-offset, while the right column represents upgoing reflected wave fields. $D_P$, $U_P$, $D_M$, $U_M$ and $U_S$ are the received wavefields associated with the direct P arrival, the multiples and other shear waves, respectively.

In Equation (1), only the first correlation of the downgoing direct P-wave $D_P(r_A|r_S; t)$ with upgoing $U_P(r_B|r_S; t)$ forms a correct image. The remaining correlation generates VS artifacts known as the cross-talks. More generally, correlation of the wavefields at $r_A$ and $r_B$ belonging to the same wave mode will produce correct events while other groupings may not due to incorrect phase. Equation (1) has been newly developed to address the impact of cross-talk to data quality, whereas conventional VS has not addressed this impact.

Cross-correlation with wavelet transform.

For a given 1D signal D(t), the forward continuous wavelet transform can be defined as:

$$\Psi^\varphi(f, \tau) = \frac{1}{\sqrt{f}} \int_{-\infty}^{\infty} D(t)\varphi^*\left(\frac{t-\tau}{f}\right)dt, \quad (2)$$

where the $\Psi^\varphi(f, \tau)$ is wavelet coefficient, f, τ are wavelet scale (can be translated to frequency for a given wavelet basis) and analyzing time, respectively. φ(t) denotes the mother wavelet, which satisfies admissibility condition and has zero mean.

For example, Morlet, Mexican Hat (Ricker), and Gabor functions are well-known wavelet functions in seismic applications. In typical implementations, the Morlet wavelet function is used due to its high-localization nature in the frequency domain. The wavelet transform maps a one-dimensional (1D) time series onto two-dimensional (2D) t-f data. An inverse wavelet transform brings the signal back to the time domain:

$$\overline{D(t)} = \frac{1}{C_\varphi} \int_0^\infty \int_{-\infty}^\infty \overline{\Psi^\varphi(f,\tau)} \frac{1}{\sqrt{f}} \varphi\left(\frac{t-\tau}{f}\right) d\tau \frac{df}{f^2}, \quad (3)$$

where $C_\varphi$ is a scaling factor.

Cross-correlation can be used to determine the relative time delay between two seismic signals, for example, the upgoing and downgoing wavefields in Equation (1). The wavelet coefficients provide a local time and frequency distribution of the seismic traces.

Wavelet cross-correlation used in VS is defined as:

$$WV(f, \tau) = \frac{1}{T} \int_{T/2}^{T/2} \Psi_D^{\varphi*}(f, t)\Psi_U^\varphi(f, t+\tau)dt, \quad (4)$$

where $\Psi_D^{\varphi*}(f,t)$ is the WT coefficient of upgoing and downgoing waves. The wavelet cross-correlation function WV(f, τ) defined as such is not only a function of the time delay τ, but also the wavelet frequency f. This allows detection of nonstationary coherence structure and potential time-lag between two seismic traces. It can be shown that WV(f, τ) is related to the classical cross-correlation $V(r_B|r_A)$:

$$|WV(f,\omega)|=|V(\omega)|\times f\times \varphi(\omega f)^2 \quad (5), \text{ and}$$

$$\angle WV(f,\omega)=\angle V(\omega) \quad (6),$$

where WV(f, ω) is wavelet cross-correlation coefficient represented in wavelet scale and frequency domain. V(ω) and φ(ωf) represent the cross-correlation and mother wavelet in Fourier domain, respectively. Equations (4), (5), and (6) have been newly developed to describe a t-f relationship while using VS.

While retaining the phase spectrum unchanged as in the traditional cross-correlation, we amplify the amplitude spectrum by factor $f \times \varphi(\omega f)^2$. As such, our approach may be considered as a phase-preserving technique. Note that WV(f, τ) is complex-valued function. Subsequent filtering in this study applies to amplitude spectrum only. Original phase of recorded data is retained to honor kinematics of the Green's function extracted from VS.

Wavelet cross-correlation filtering.

At a high-level, the described new VS redatuming method includes the following steps:

1. Wavelet transformation of downgoing and upgoing waves,
2. Cross-correlate wavelet coefficients,
3. t-f domain denoising using soft thresholding,
4. t-f-k domain suppression of ground-rolls, and
5. Inverse wavelet transformation of the filtered data back to t-x domain.

The key contribution of the new VS redatuming method is to better separate seismic components and achieve noise suppression during virtual source computation via properly filtering for specific types of noise. As an illustration of the new method, a simple example with two test signals:

$$f=\sin(43t)e^{-(t-5)^2}+\sin(22t)e^{-(t-5)^2}+\sin(11t)e^{(t-5)^2}$$

and $$g=\sin(43(t-3))e^{-(t-5)^2}+\sin(22(t-2))e^{(t-5)^2}++\sin(11(t-1))e^{(t-5)^2}$$

are plotted in FIG. 1.

In some implementation, the output of the described approach for VS denoising can be used to dynamically influence, direct, control, manage, or make operational decisions with respect to tangible equipment (for example, hydrocarbon drilling, refining, pumping/transport, or other tangible equipment). As a particular example, real-time data received from an ongoing drilling operation can be analyzed and processed using the described methodology to detect underground structures/obstructions. In some instances, and based on the detected underground structures/obstructions, dynamic operations can be performed which affect tangible, real-world equipment. For example, based on VS denoising methodology output (such as, a determined reservoir zone thickness, a predicted instability zone, or a fault-and-fracture analysis): 1) a wellbore trajectory can be modified; 2) a hydrocarbon drill speed can be increased, decreased, or stopped; 3) alerts can be generated/transmitted; 4) an alarm can be activated/deactivated (such as, visual, auditory, or voice alarms); 5) a proactive measure can be undertaken; or 6) other dynamic operation performed.

In some implementations, the described approach can be integrated as part of a real-time, computer-implemented, dynamic control system for any tangible equipment consistent with this disclosure. In some instances, the dynamic control system can be used in an automated or semi-automated manner. Moreover, in some instances, the dynamic control system can be used to manage and control other dynamic control systems based one or more results of the described methodology, other received data, or a combination of the two.

The described VS denoising methodology can also be used to enhance the operation of a computer or computer system in comparison to conventional denoising methodologies. For example, the described VS denoising methodology does not require a near-surface model. Not requiring a near-surface model can at least reduce the need for computer processing, data storage, data transfer, and network bandwidth/transmission. The described VS denoising technology can improve the operation of computer or computer system by increasing efficiency of at least one or more aspects of the computer or computer system.

In some implementations, the described methodology can be combined with artificial intelligence, pattern matching, or trend analysis technologies. These technologies can be used to enhance the effectiveness of the described VS denoising methodology. For example, the artificial intelligence, pattern matching, or trend analysis technologies can be used to pre-process, process, post-process, enhance, or modify data associated with the described methodology. As a particular example, an artificial intelligence system can be used to shortcut the described VS denoising methodology (that is, based on prior results and training data sets, make a determination of results prior to normal completion of the VS denoising process) to further increase speed of operation and decrease computing requirements related to processing, data storage, and network bandwidth/transmission. The results of these operations can also be used to dynamically influence, direct, control, or manage the previously described tangible equipment in conjunction with the previously described computer-implemented dynamic control system.

The usage examples have been provided to aid in understanding and are not meant to limit the disclosure in any way. The described methodology also has applicability in technical areas requiring image processing outside of hydrocarbon-related seismic data. For example, numerous technical fields requiring detection of targets or objects in received image or other data can leverage the described methodology. Modifications to the described methodology to permit use in the other technical fields will be within the scope of those of ordinary skill in the art. Any use of the described methodology that is consistent with the concepts presented in this disclosure is considered to be within the scope of this disclosure.

FIG. 1 is a graph illustrating a plot 100 of two synthetic test signals, f and g, according to an implementation of the present disclosure. There are three events in each signal, f 102 and g 104, with frequencies at 43, 22, and 11 Hz, and featuring delays of 3, 2, and 1 seconds between signals f 102 and g 104, respectively. Note that the events, frequencies and delays cannot be identified in FIG. 1. The described wavelet cross-correlation can be used to identity these attributes (for example, as in FIG. 2C).

Figure 2B:
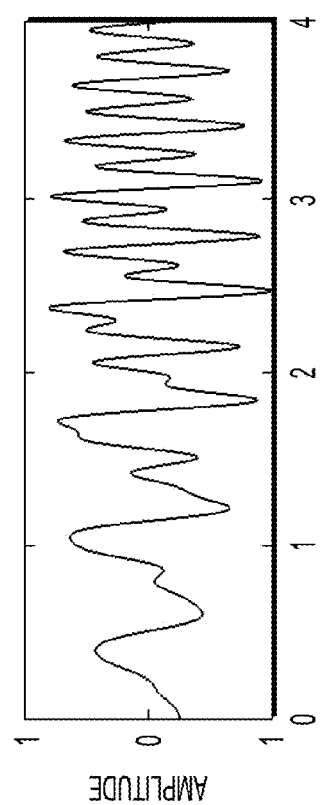
FIGS. 2A-2D illustrate different stages of wavelet cross-correlation filtering, according to an implementation of the present disclosure.
Figure 2A:
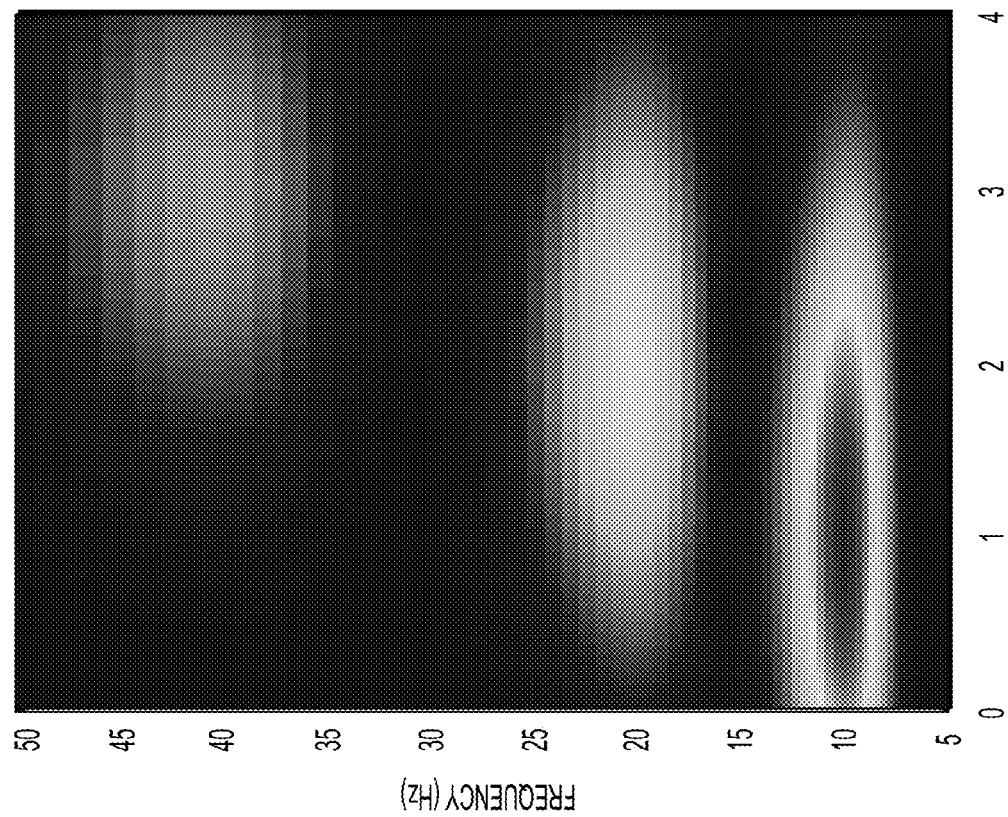
Figure 2D:
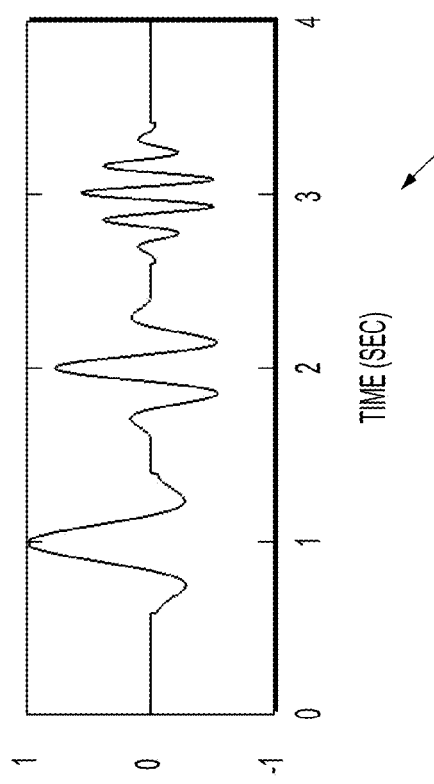
Figure 2C:
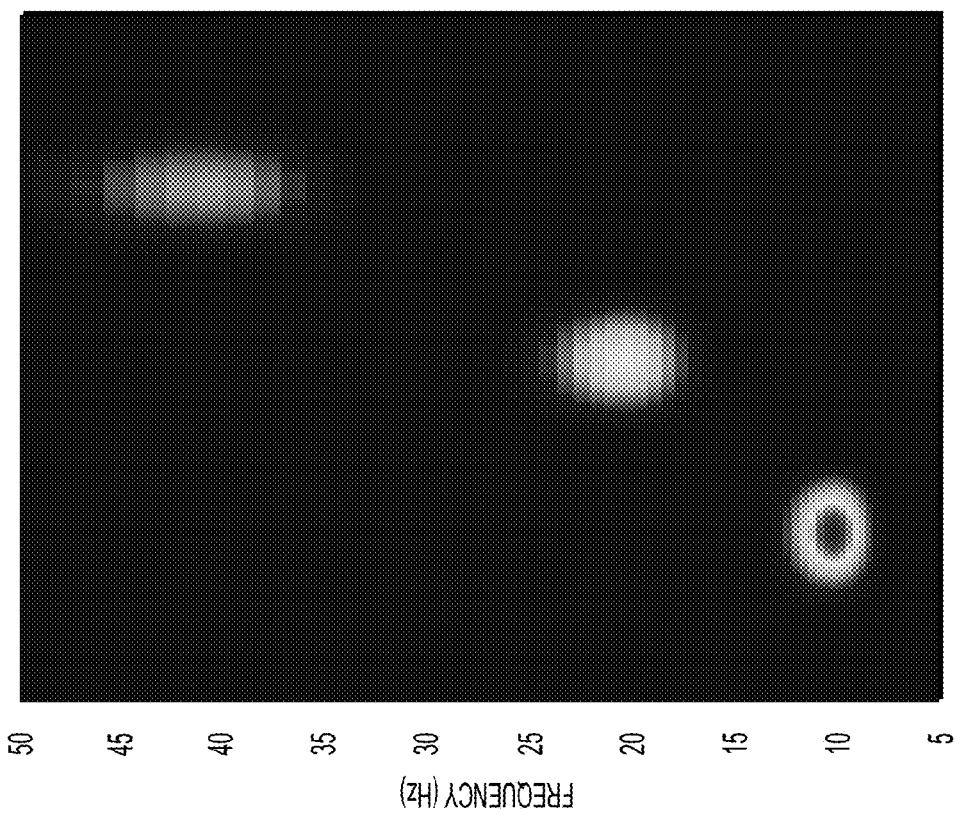

FIGS. 2A-2D illustrate different stages (200a-200d) of wavelet cross-correlation filtering, according to an implementation of the present disclosure. For example, FIG. 2A represents an amplitude spectrum of WT correlation in the t-f domain, FIG. 2B represents a raw cross correlation trace between test signals f 102 and g 104 of FIG. 1, FIG. 2C represents FIG. 2A following 2D thresholding filtering, and FIG. 2D represents an inverse WT output of the filtered correlation of FIG. 2C.

A standard cross-correlation between f 102 and g 104 of FIG. 1, due to the non-stationarity nature of the traces, provides no evidence for the exact time lags (for example, as in FIG. 2B). In contrast, wavelet cross-correlation expands the correlation in the f, τ domain and determines a delay between two processes at each frequency (for example, as in FIG. 2A). Image-segmentation-based 2D thresholding (for example, as in FIG. 2C), is implemented to enhance the resolution in both the time and frequency domain.

The image-segmentation-based 2D thresholding is applicable in the overall described methodology as part of 2D t-f domain denoising and filtering and is typically performed as follows: 1) threshold and erase background random noises; 2) mark each signal event as a foreground object; 3) open-closing each object by reconstruction edges; 4) label each object and make soft thresholding for wavelet coefficients if necessary; 5) create mask based on object label; and 6) apply mask to 2D t-f domain and invert back to 1D time series. Typical implementations can use well-known image segmentation methods. Other implementations, can use modified or custom-developed image segmentation methods.

As a result of using image-segmentation-based 2D thresholding, the inverse wavelet transform of this filtered output produces a time series with significantly better time-delay separation for each event (FIG. 2D). As a result, the inverse wavelet transform of this filtered output produces a time series with significantly better time-delay separation for each event (for example, FIG. 2D). Similar to 2D t-f filtering, 3D t-f-k in a shot domain is very effective in attenuating coherence noises such as surface waves and air waves. Similar to unfolding a common shot gather using an S-transform, or local t-f decomposition, wavelet cross-correlation provides an additional dimension to mitigate ground-roll during the following VS redatuming method.

Field data processing and results.

In a pilot study of a seismic survey for carbon dioxide enhanced oil recovery (CO2 EOR), thirteen time-lapse surveys were acquired over the course of 19 months. The acquisition includes a 2D line of 80 buried receiver stations configured with collocated geophones and hydrophones cemented in vertical boreholes, with 30 m spacing along the line. Sensors were deployed 30 m beneath the surface of the earth, below a low velocity near-surface layer of unconsolidated sand. A single surface vibrator was used across a dense 3D array (7.5 m inline and 7.5 m crossline), intended for optimal one-sided illumination above the output VS location. Data was preprocessed with noise removal, and VS redatuming and common depth point (CDP) stacking. F-k filtering was applied in the common-receiver domain. During the VS processing, an auto-picking algorithm is used to pick the first arrivals. In other words, the unprocessed near offset data was considered as the downgoing wave and the late-arriving reflections approximated as an upgoing wave. F-k domain noise removal and demultiple procedure were applied to the upgoing wave.

Figure 3A:
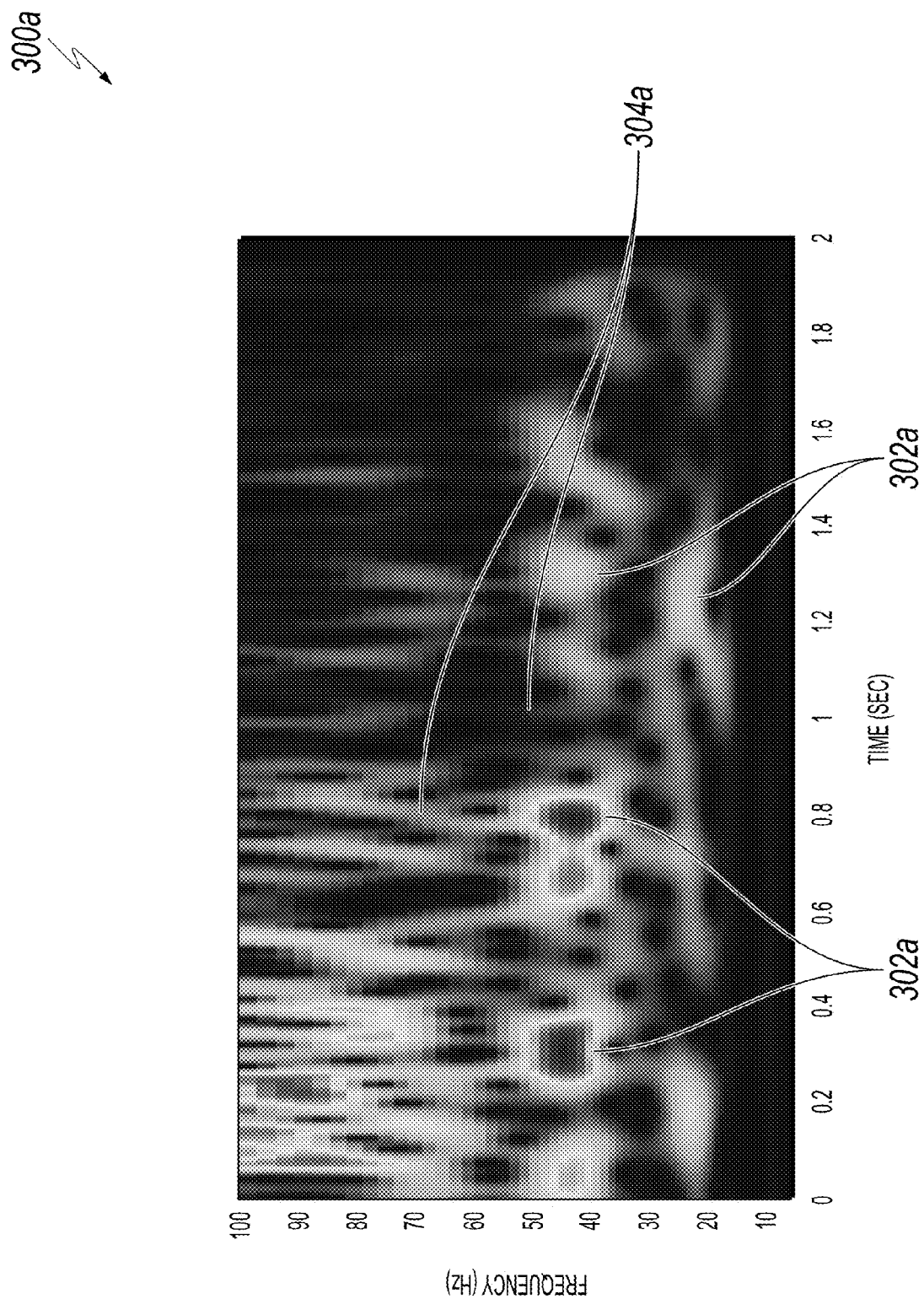
FIG. 3A is a plot illustrating wavelet coefficients of a VS trace in the time-frequency (t-f) domain using a wavelet cross-correlation, according to an implementation of the present disclosure.

FIG. 3A is a plot 300a illustrating wavelet coefficients of a VS trace in the t-f domain using a wavelet cross-correlation, according to an implementation of the present disclosure. After the pre-processing, a WT was applied to the upgoing and downgoing data, respectively. The resulting wavelet coefficients were provided as inputs to a wavelet cross-correlation. This procedure was carried out individually for each trace in the input array aperture. Compared to a conventional cross-correlation performed only in the time domain, the wavelet cross-correlation also enhances the coherence energy between upgoing and downgoing wavefields in the t-f plane, providing a better representation of reflection signal versus background scattering noise. A strong energy spot 302a (for example, illustrated as yellow-red polygons), represents real reflection signals generated by target reflectors, while weaker events 304a (for example, illustrated as randomly-shaped blue-yellow areas 304a) represent background scattering noises. It is desirable to remove the scattering noises to enhance the overall signal-to-noise ratio.

Figure 3B:
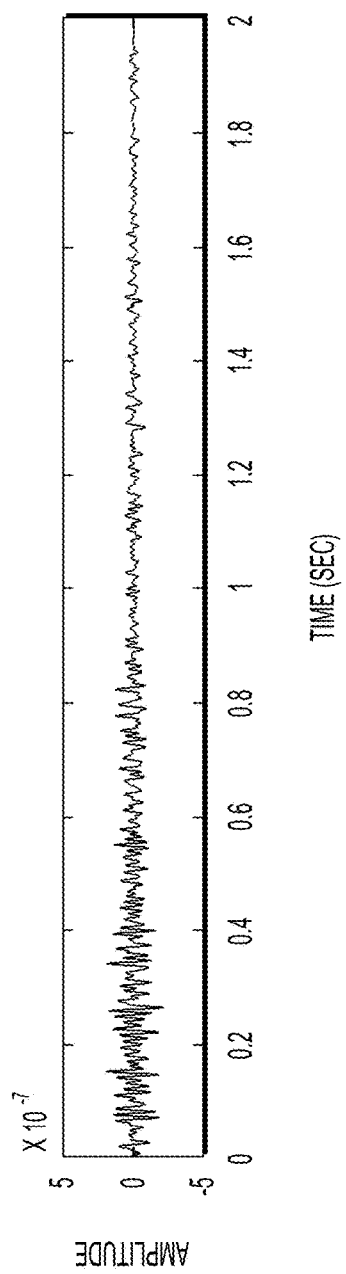
FIG. 3B is a graph illustrating a correlation trace in the time domain corresponding to FIG. 3A, according to an implementation of the present disclosure.

FIG. 3B is a graph 300b illustrating a correlation trace in the time domain corresponding to FIG. 3A, according to an implementation of the present disclosure. As illustrated in FIG. 3B, the t-f filtering can effectively remove background random noises and scattering artifacts from the input.

Figure 4A:
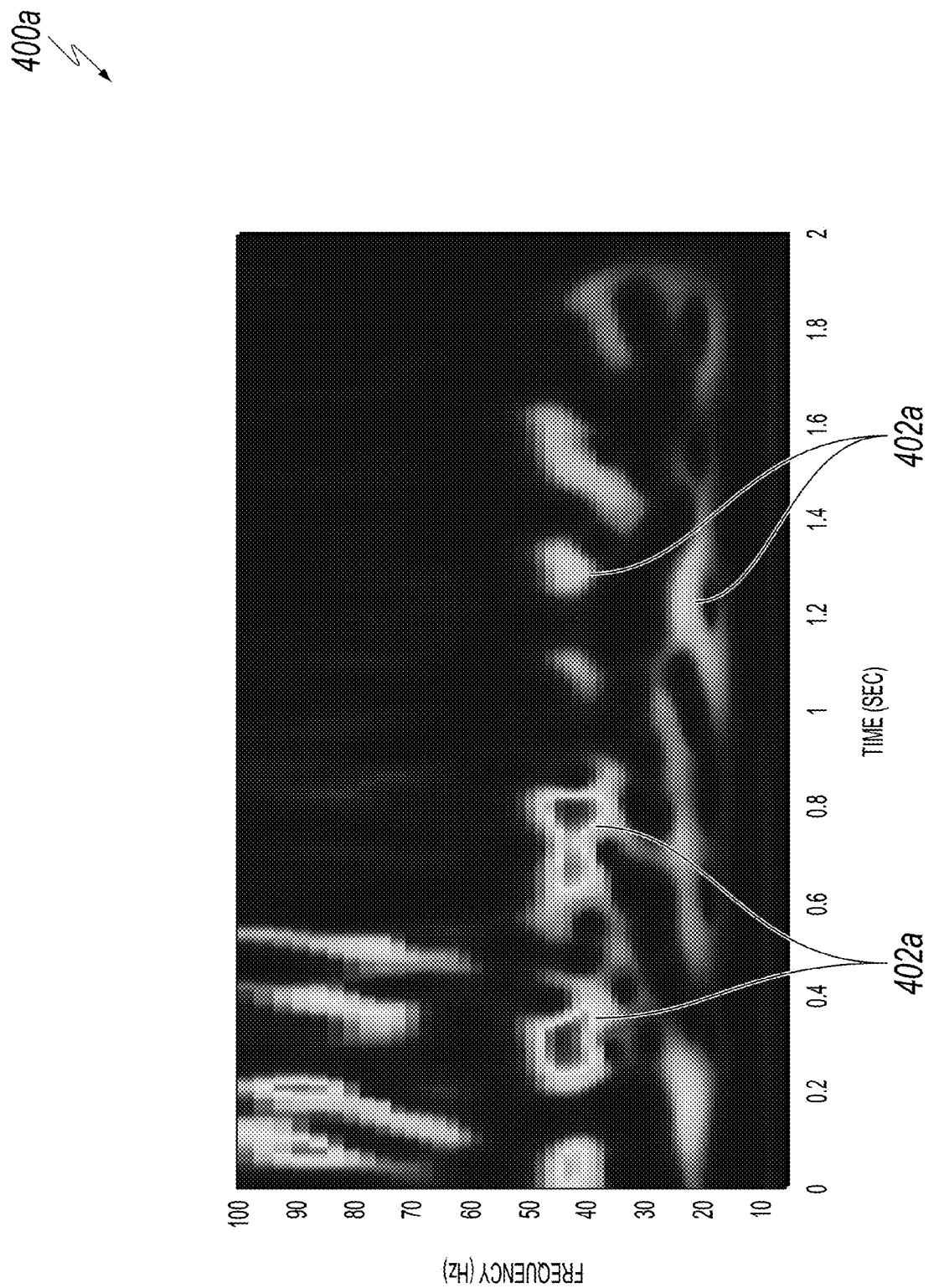
FIG. 4A is a plot of wavelet coefficients after soft thresholding filtering of amplitude spectrum in a sliding window, according to an implementation of the present disclosure.

FIG. 4A is a plot 400a of wavelet coefficients after soft thresholding filtering of amplitude spectrum in a sliding window, according to an implementation of the present disclosure. Soft thresholding is applied to the amplitude spectrum of the wavelet coefficients of FIG. 3A within a sliding window. A sliding window of fixed time and frequency length is used to compute a maximum amplitude coefficient of wavelet correlation within the sliding window. The threshold is computed as a reference level based on a portion of the max value, and any point in the window lower than the reference is muted (for example, set as zero or other value). The sliding window then slides down one sample and the next muting can be performed. The process continues until the entire 2D t-f plane has been muted. Note that the use of the described soft thresholding is attractive because pre-stack data is usually of a large volume data size, so it is expensive (for example, computationally or timewise) for a user to perform quality control on the prestack data. It is typically practical to choose a mild thresholding level to mitigate risks of hurting signals rather than noise in order to process pre-stack original data. Note the remaining strong energy spots 402a (for example, illustrated as yellow-red polygons corresponding to values 302a in FIG. 3A) after the muting process completes.

Figure 4B:
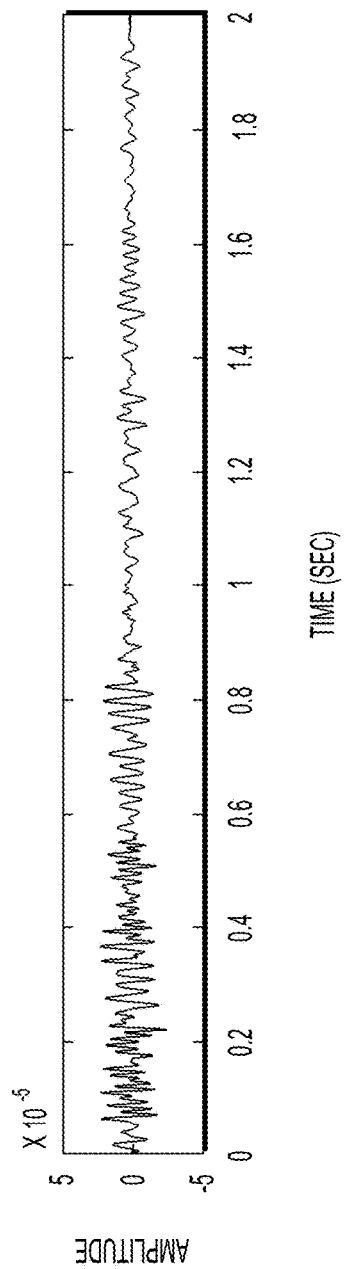
FIG. 4B is a graph illustrating conservation of dominant reflection energy in the output, according to an implementation of the present disclosure.

FIG. 4B is a graph 400b illustrating conservation of dominant reflection energy in the output, according to an implementation of the present disclosure. In comparing FIGS. 4A and 3A, soft thresholding performed by sliding windows preserve the reflection signals (for example, illustrated yellow-red polygons 402a and 302a, respectively) and mitigate scattering noises (for example, illustrated randomly-shaped blue-yellow areas 304a). The figures demonstrate a simple 2D thresholding filtering to boost signal-to-noise ratio. With respect to an inverted wavelet transform, FIGS. 4B and 3B demonstrate the same.

Figure 5A:
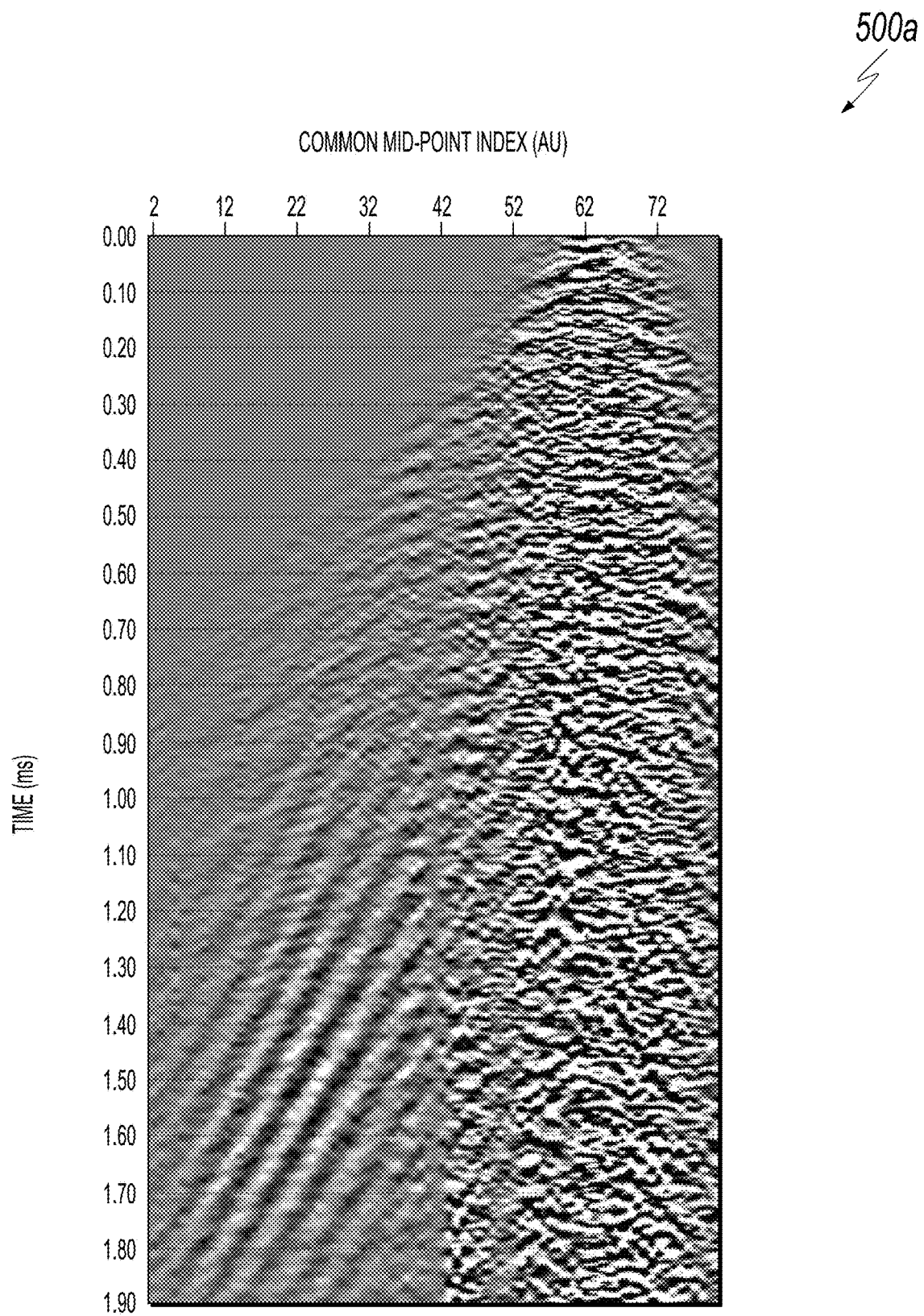
FIG. 5A is a graph illustrating a VS shot gather obtained from a cross-correlation based VS, according to an implementation of the present disclosure.

FIG. 5A is a graph 500a illustrating a VS shot gather obtained from a cross-correlation based VS, according to an implementation of the present disclosure. The displayed time interval is represented on the vertical axis from 0 ms to 1900 ms and with timing lines every 100 ms. The horizontal axis represents a common mid-point index with index values from 0 to 80 in arbitrary units (AU), where the common mid-point index represents a total distance of 0-2400 m. The spacing between each two index points is 30 m. As shown in FIG. 5A, the described method is extended to process an entire VS shot gather contaminated by residual radial ground roll.

Figure 6:
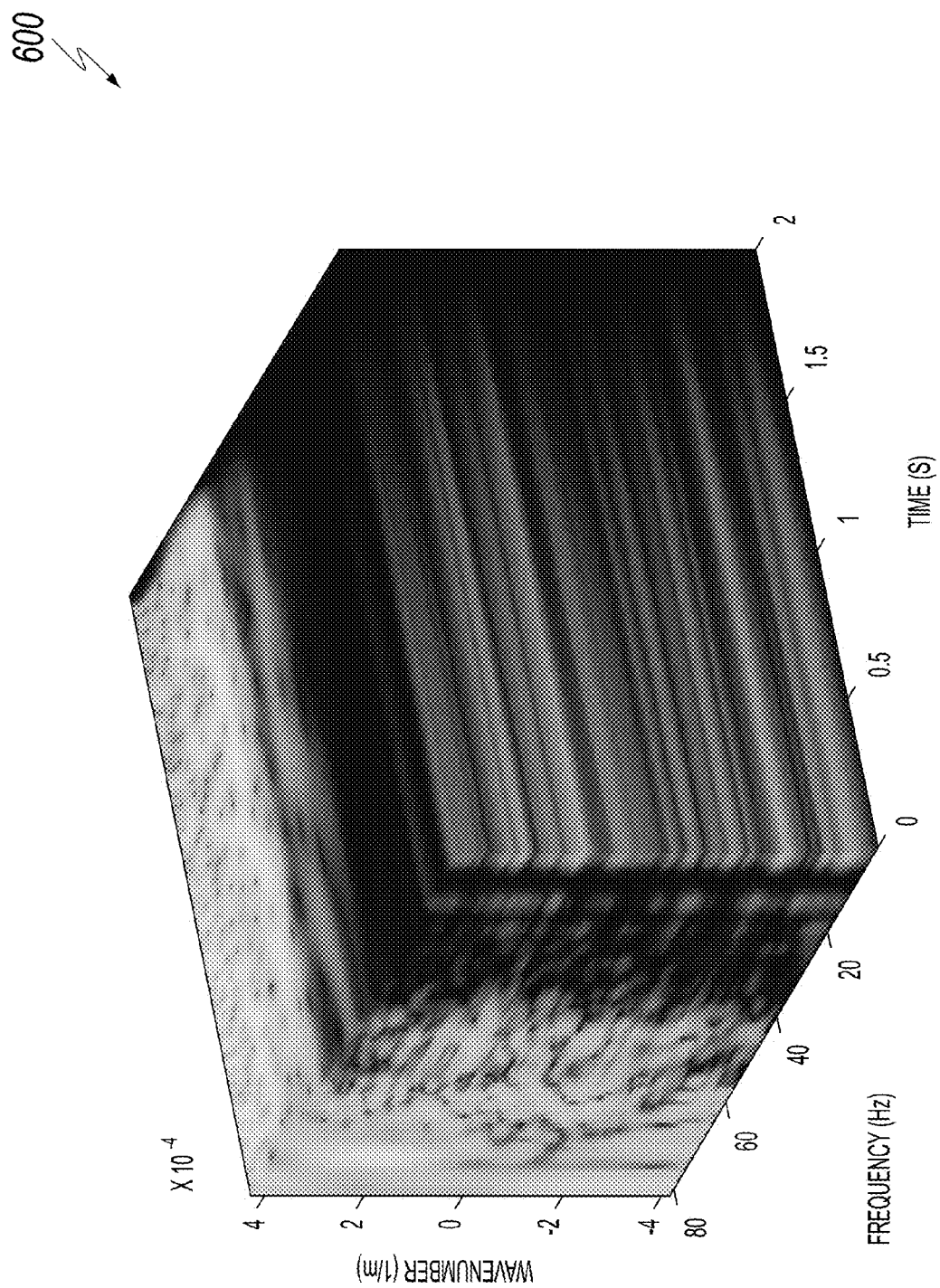
FIG. 6 is a plot of an amplitude spectrum of wavelet coefficients of an entire VS shot gather (for as in example, FIG. 5A) using wavelet cross-correlation in a t-f-k domain, according to an implementation of the present disclosure.

FIG. 6 is a plot 600 of an amplitude spectrum of wavelet coefficients of an entire VS shot gather (for example, FIG. 5A) using wavelet cross-correlation in a t-f-k domain, according to an implementation of the present disclosure. In FIG. 6, a time-frequency-receiver (t-f-x) cube is generated by gathering slices in the wavelet domain from each receiver. The data is Fourier transformed along the receiver (x) dimension to obtain the corresponding wavenumber spectra.

Figure 5B:
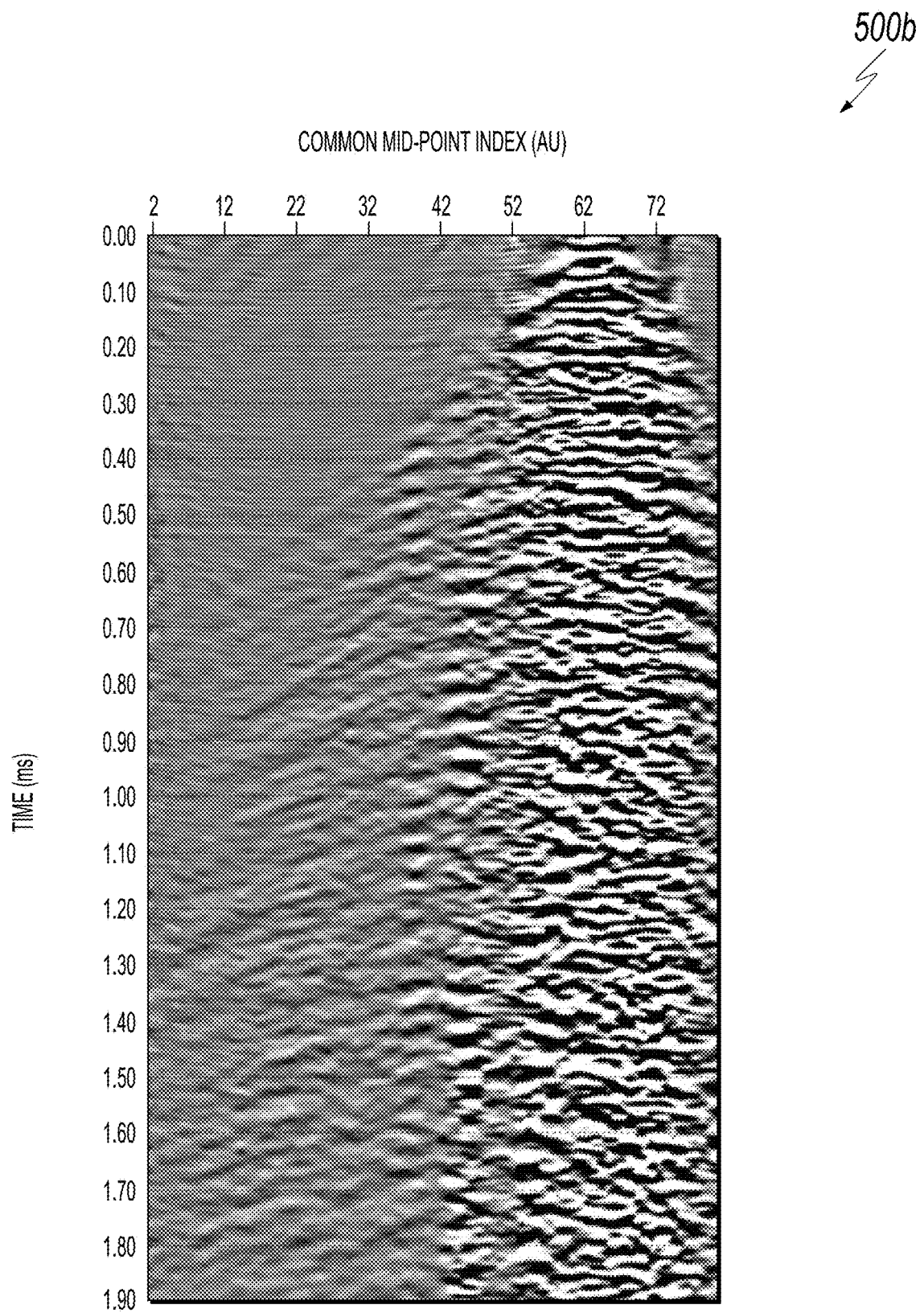
FIG. 5B is a graph illustrating a wavelet cross-correlation VS after t-f and time-frequency-wavenumber (t-f-k) filtering is performed, according to an implementation of the present disclosure.

FIG. 5B is a graph 500b illustrating a wavelet cross-correlation VS after t-f and t-f-k filtering is performed, according to an implementation of the present disclosure. The displayed time interval is represented on the vertical axis from 0 ms to 1900 ms and with timing lines every 100 ms. The horizontal axis represents a common mid-point index with index values from 0 to 80 in AU, where the common mid-point index represents a total distance of 0-2400 m. The spacing between each two index points is 30 m. The wavelet cross-correlation can be flexibly adjusted to obtain the desired time and frequency resolution.

Figure 7:
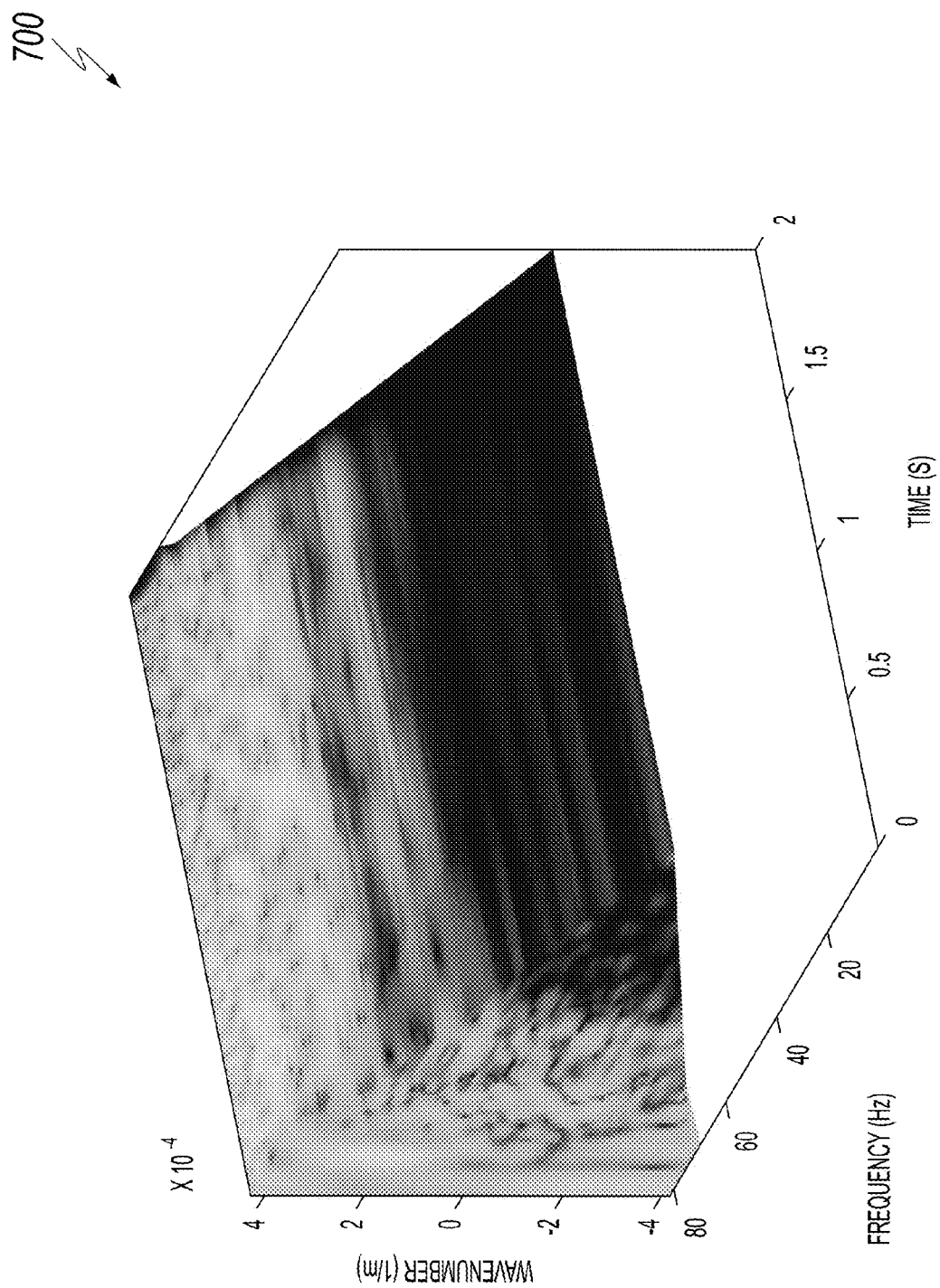
FIG. 7 is a plot of the filtered output of the amplitude spectrum of FIG. 6, according to an implementation of the present disclosure.

FIG. 7 is a plot 700 of the filtered output of the amplitude spectrum of FIG. 6, according to an implementation of the present disclosure. FIG. 7 illustrates output of a simple muting filter to remove ground roll noise components of in the t-f-k domain from FIG. 6. After an inverse wavelet transform is performed on FIG. 7, the recovered signal is shown in FIG. 5B in the original domain. Note that the filter in the t-f-k domain can be designed in more specific and sophisticated forms to suit the signal and noise structures. The time-varying aspect of the t-f-k filter permits addressing dynamics and nonstationarity of wavefields. With a stationary filter, this method degenerates into f-k filtering that simply mutes the selected frequencies. FIGS. 5A-5B illustrate that even with a simple t-f-k filter, wavelet cross-correlation is able to eliminate residual ground-roll during the VS process, whereas traditional VS is not successful.

Similar to other thresholding-based denoising methods for seismic data, the assumption of the previously described filter is the representation of signal (that is, target reflection) in a 2D t-f domain or a 3D t-f-k space having greater energy than noise (in other words, a signal contains more energy than noise). As there is no wave propagation physics behind simple thresholding, simple thresholding only removes weaker energy references to a certain level Therefore success of simple thresholding relies on a sufficient removal for large amplitude noises, particularly ground-roll noise in large offsets and near surface scattering noises in desert land applications.

Furthermore, different decompositions can be combined to improve denoising capabilities. For example, simple geology layers with small dip angles may suit for t-f plus t-f-x thresholding, given its limited lateral variance in the x dimension. Whereas, geology associated with faults and salt dome may qualify adaptive mask filtering in t-f-k domain or t-k domain. General 3D filtering is more expensive than 2D, but more efficient to address non-stationary properties of seismic data in higher dimensions.

In standard seismic processing procedures, output VS records are obtained from post-wavelet correlation gathers stacked with common offsets. The CDP stack stage includes a minor static correction to flat datum, normal move out, trace-by-trace amplitude balancing, and mute.

Figure 8A:
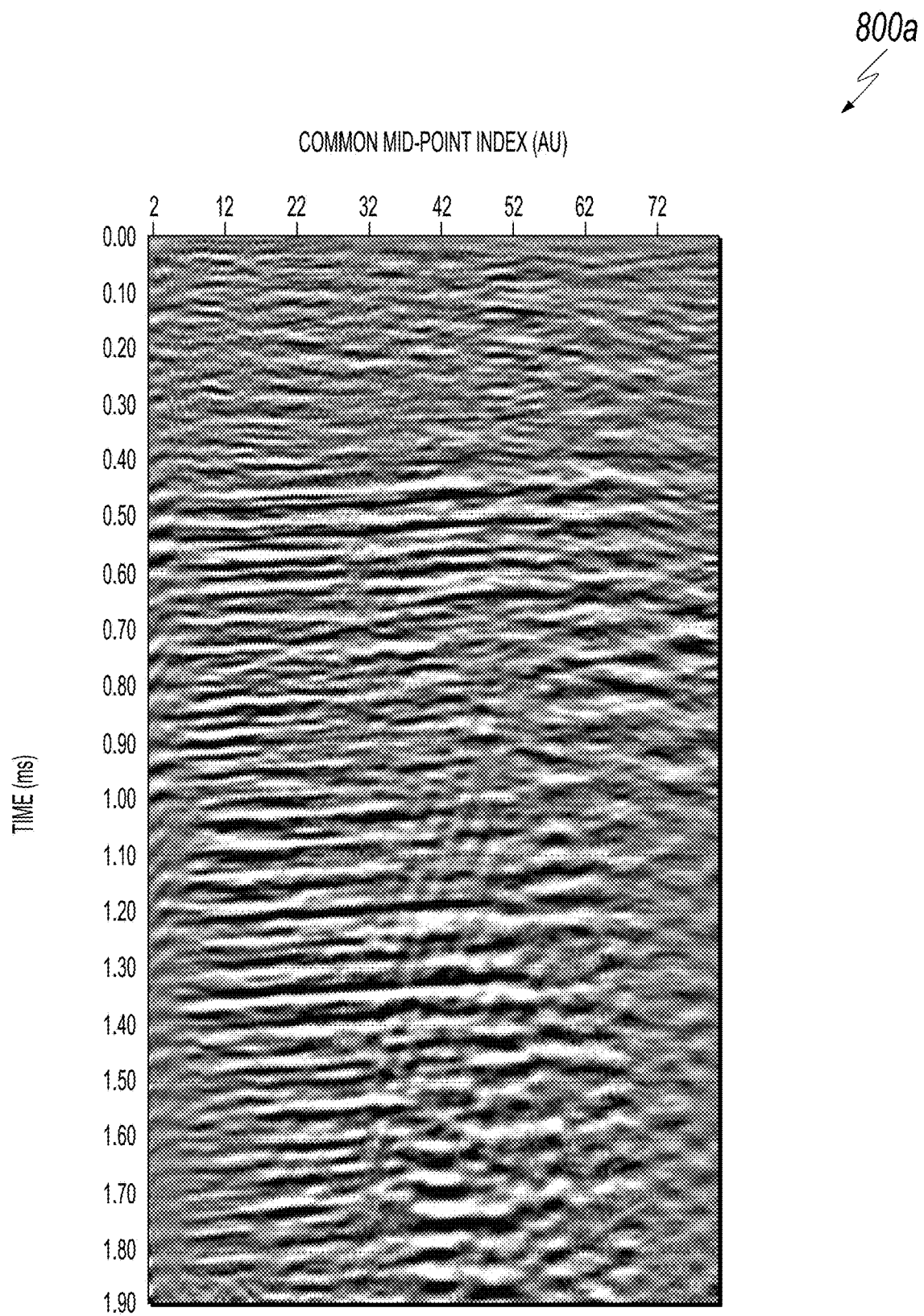
FIGS. 8A-8B are plots illustrating stacks for one seismic field survey, according to an implementation of the present disclosure.
Figure 8B:
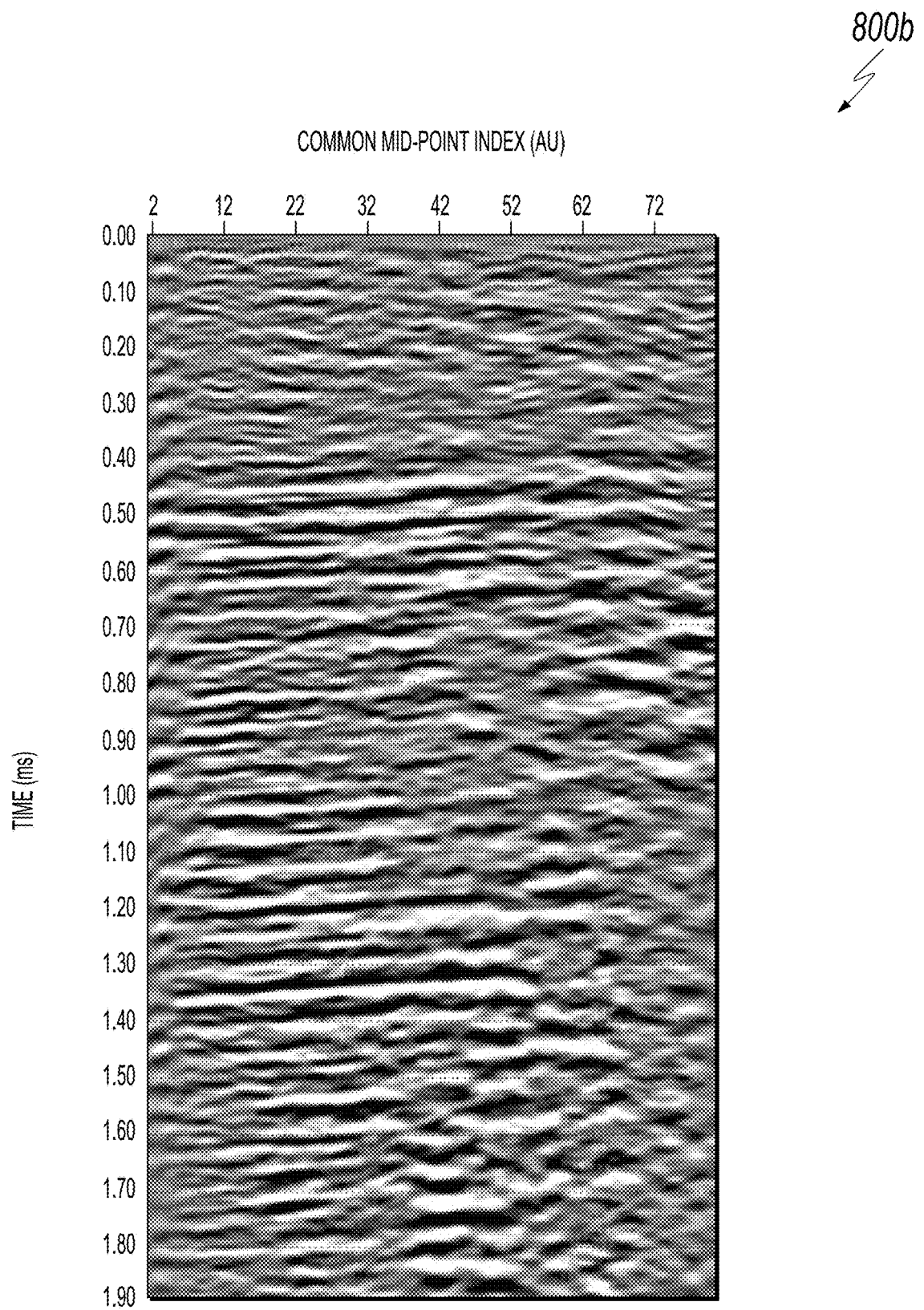

FIGS. 8A-8B are plots (800a-800b) illustrating stacks for one seismic field survey, according to an implementation of the present disclosure. FIG. 8A illustrates a graph 800a of a CDP stack obtained from a cross-correlation-based VS shot gather. FIG. 8A represents output from a conventional VS and shows contamination by residual ground-roll and scattering noises. FIG. 8B is a graph 800b illustrating a CDP stack obtained from a wavelet cross-correlation-based VS shot. For both FIG. 8A and FIG. 8B, the displayed time interval is represented on the vertical axis from 0 ms to 1900 ms and with timing lines every 100 ms. The horizontal axis represents a common mid-point index with index values from 0 to 80 in AU, where the common mid-point index represents a total distance of 0-2400 m. The spacing between each two index points is 30 m. The wavelet cross-correlation stack of FIG. 8B shows much improved signal continuity on several reflectors when compared to FIG. 8A.

Figure 9:
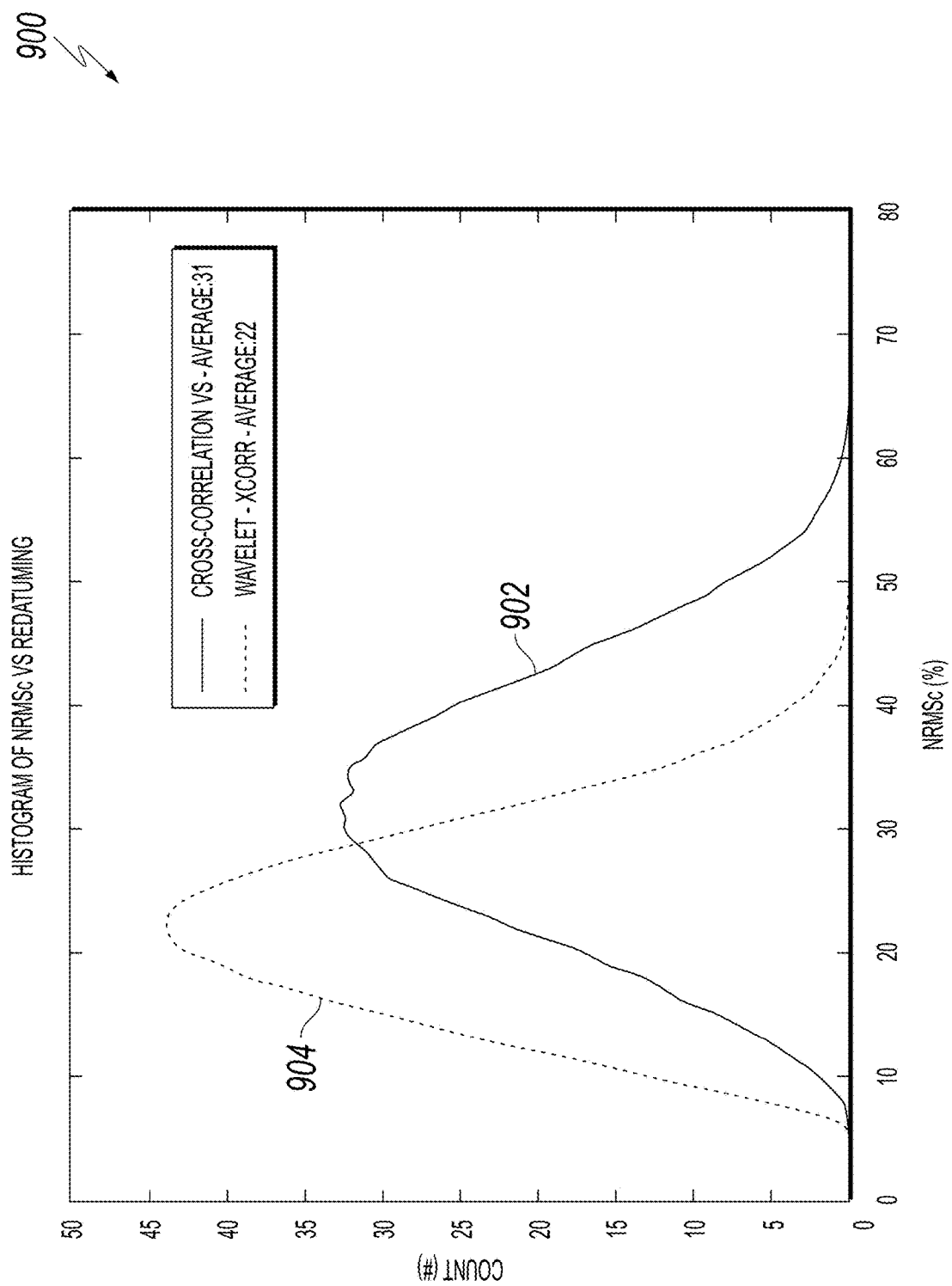
FIG. 9 is a histogram graph illustrating a comparison of image quality between the described new VS redatuming method and a traditional method, according to an implementation of the present disclosure.

FIG. 9 is a histogram graph 900 illustrating a comparison of image quality between the described new VS redatuming method and a traditional method, according to an implementation of the present disclosure. As illustrated, FIG. 9 is a histogram of new continuity metric (NRMSc) values of two methods, where wavelet cross-correlation of VS redatuming has small NRMSc values, which are designed to measure continuality of image reflectors. The comparison is a calculation of a normalized root mean square (NRMS) between adjacent CDPs. The NRMSc metric is useful in that it has the same input time window and same units as NRMS. Cross-correlation based on VS 902 stands out as a poorer image compared with wavelet correlation 904. This is consistent with observations made in FIGS. 8A & 8B. FIG. 8A indicates many low-frequency stripe-types of noise from top right to bottom middle-left which damages the overall image quality. Also included is residual surface wave noise, plus many weak background noises. In contrast, with respect to FIG. 8B, ground-roll noise has been significantly attenuated and major reflector data strengthened.

Figure 10:
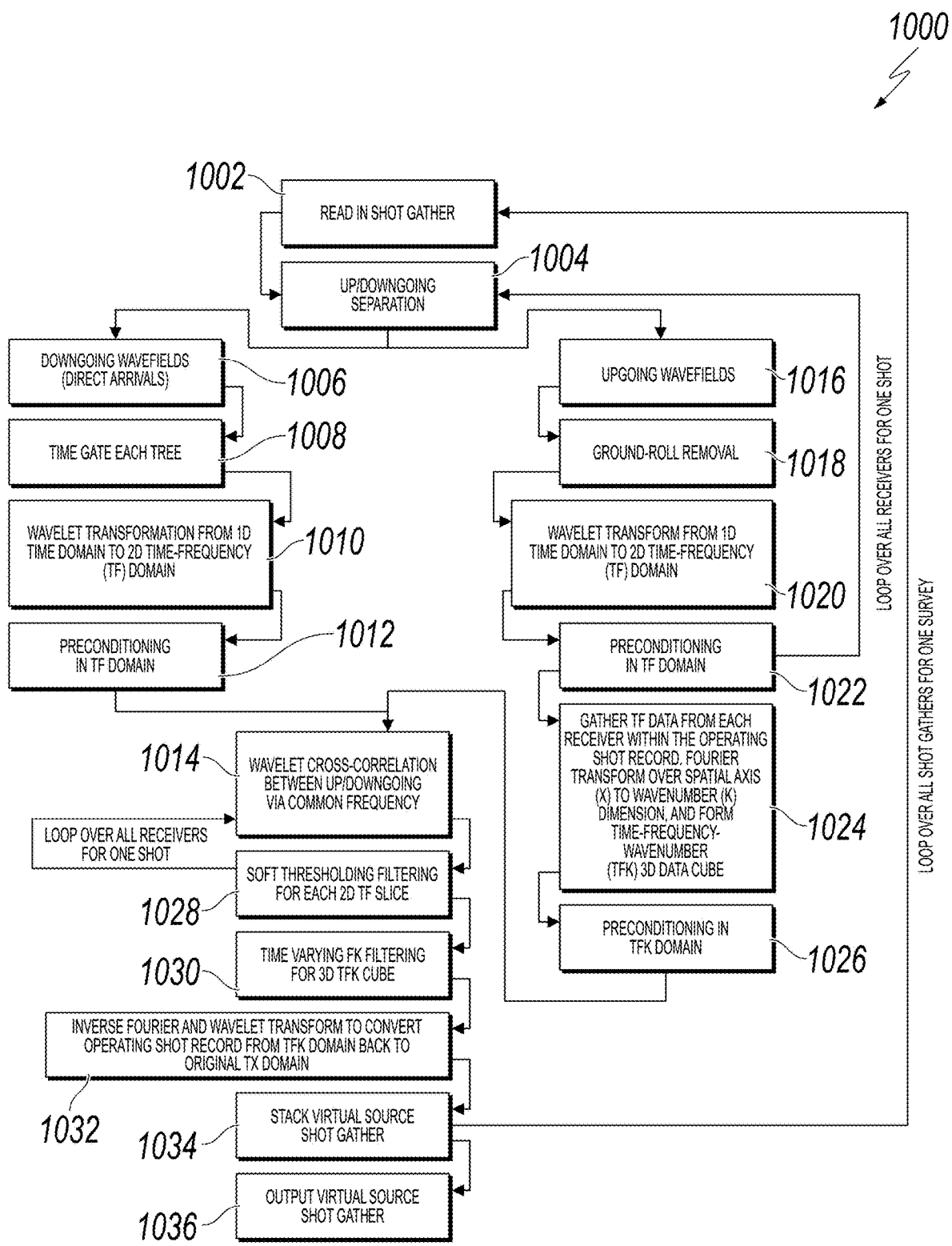
FIG. 10 is a flowchart of an example method for the use of wavelet cross-correlation for VS denoising, according to an implementation of the present disclosure.

FIG. 10 is a flowchart of an example method 1000 for the use of wavelet cross-correlation for VS denoising, according to an implementation of the present disclosure. For clarity of presentation, the description that follows generally describes method 1000 in the context of the other figures in this description. However, it will be understood that method 1000 may be performed, for example, by any suitable system, environment, software, and hardware, or a combination of systems, environments, software, and hardware as appropriate. In some implementations, various steps of method 1000 can be run in parallel, in combination, in loops, or in any order.

At 1002, seismic shot gather data is loaded for processing. A seismic shot is a gather (a collection) of seismic data (a trace) recorded by each individual geophone/hydrophone involved in recording the seismic data. For example, the seismic shot gather data can be received/loaded from a local or remote data storage and loaded into a computer memory for processing. From 1002, method 1000 proceeds to 1004.

At 1004, upgoing and downgoing wavefields associated with a seismic trace are separated. Note that the following steps 1016-1022 are repeatedly performed for each trace until one seismic shot gather is looped over. The processing path in the described workflow is associated with geophones and hydrophones. A hydrophone records only a scalar pressure response and does not distinguish between up and down wavefields. A geophone records a vector displacement of a buried receiver position that is different for the up and down wavefield. The effective combination (for example, using adaptive summation or subtraction) of these components can output upgoing and downgoing wavefields. If a geophone and a hydrophone installation is available in-field, an upgoing/downgoing wavefield separation is desired to meet prerequisites (the upgoing wavefields correlated with the downgoing wavefields) of VS. Otherwise, direct early arrival wavefields are treated as downgoing waves and target reflection data is treated as upgoing wavefields. Note that in typical implementations either path (downgoing wavefields or upgoing wavefields) can be processed before the other or both paths can be processed in parallel. In the instant workflow description, it is assumed that both downgoing wavefields and upgoing wavefields are available for processing. While not focusing on chronological aspects of the processing between the downgoing wavefields and the upgoing wavefields, downgoing wavefield processing will be discussed first with respect to the example workflow. If it is determined that downgoing wavefields and upgoing wavefields are available for processing, the seismic shot gather data is separated into downgoing wavefields and upgoing wavefields and placed into separate computing memory storage locations for further processing. From 1004, method 1000 proceeds to 1006.

Downgoing Wavefield Data.

At 1006, the separated downgoing wavefields are made available for processing. In some implementations, the downgoing wavefields can be processed in any manner consistent with this disclosure prior to further processing. From 1006, method 1000 proceeds to 1008.

At 1008, the downgoing wavefield data is time gated—a time window is used to isolate direct early arrival wavefields from downgoing wavefields. From 1008, method 1000 proceeds to 1010.

At 1010, the downgoing wavefield data is wavelet transformed from a 1D time domain to a 2D t-f domain. Note that 1010 is related to Equation (2). From 1010, method 1000 proceeds to 1012.

At 1012, the downgoing wavefield data is optionally preconditioned to ensure that the data has smoothed variations along the t and f axis. Preconditioning provides a better input value for wavelet filtering. Typically, reversed automatic gain control processing is performed as preconditioning. From 1012, method 1000 proceeds to 1014.

Upgoing Wavefield Data.

At 1016, upgoing wavefields are made available for processing. In some implementations, the upgoing wavefields can be processed in any manner consistent with this disclosure prior to further processing. From 1016, method 1000 proceeds to 1018.

At 1018, the upgoing wavefield data has an f-k filter applied to remove ground-roll noises (events) which have a small apparent velocity or equivalently a large dip. In typical implementations, ground roll noises are isolated by performing a 2D Fourier transform. In that domain, a ground roll is located in a fan-like region. By zeroing Fourier transform values in this fan and then performing an inverse Fourier transform, the ground roll can be removed. From 1018, method 1000 proceeds to 1020.

At 1020, the f-k filtered upgoing wavefield data is wavelet transformed from a 1D time domain to a 2D t-f domain. Note, 1020 is related to Equation (2). From 1020, method 1000 proceeds to 1022.

At 1022, the upgoing wavefield data is preconditioned (as described in 1012) to ensure that the data has smoothed variations along the time and frequency axis. The loop back to 1004 indicates the same flow applies to every receiver (seismic trace) in a shot record. From 1022, method 1000 proceeds to 1024.

At 1024, t-f data is gathered from each receiver within an operating shot record. The gathered t-f data is Fourier transformed over a spatial axis (x) (note that x=the spatial axis=a particular receiver) to a wavenumber (k) dimension to form a t-f-k 3D data cube. In other words, a t-f-x data cube is generated by gathering slices in the wavelet domain from each receiver. The Fourier-transformation along x obtains corresponding wavenumber spectra. From 1024, method 1000 proceeds to 1026.

At 1026, the 3D data cube is preconditioned (as described in 1012) to ensure that the data has smoothed variations along the k dimensional axis. From 1026, method 1000 proceeds to 1014.

At 1014, a wavelet cross-correlation is performed between the downgoing wavefields in the time-frequency domain and the upgoing wavefields in the time-frequency-wavenumber domain. The correlation is performed using a common frequency. FIGS. 3A and 4A and associated description provide an example of performing a wavelet cross-correlation as described. Note that 1014 is related to Equation (4). From 1014, method 1000 proceeds to 1028.

At 1028, soft thresholding is performed using sliding windows for each time-frequency slice of an output wavelet coefficient cube. The same procedure is looped over (loop back shown to 1014) for all receivers (seismic traces) in the shot records. From 1028, method 1000 proceeds to 1030.

At 1030, a mask-based time-varying f-k filter is applied to the entire t-f-k cube (for example, as in FIG. 6). The mask is basically a binary 0 or 1 cube filter—a dot product with input data for filter purposes. From 1030, method 1000 proceeds to 1032.

At 1032, an inverse wavelet transform is used to bring wavelet correlated data from the t-f-k domain back to the t-x domain. Note that 1032 is related to Equation (3). From 1032, method 1000 proceeds to 1034.

At 1034, loop over all seismic shots available in a database and stack wavelet-correlated records as a VS gather. The VS loops over all available shot records a user wishes to process. The condition is that once all shot records are processed, the flow advances to 1036. From 1034, method 1000 proceeds to 1036.

At 1036, the VS gather is output. For example, the VS gather can be stored onto a magnetic or optical computer disk or a flash memory. After 1036, method 1000 stops.

Figure 11:
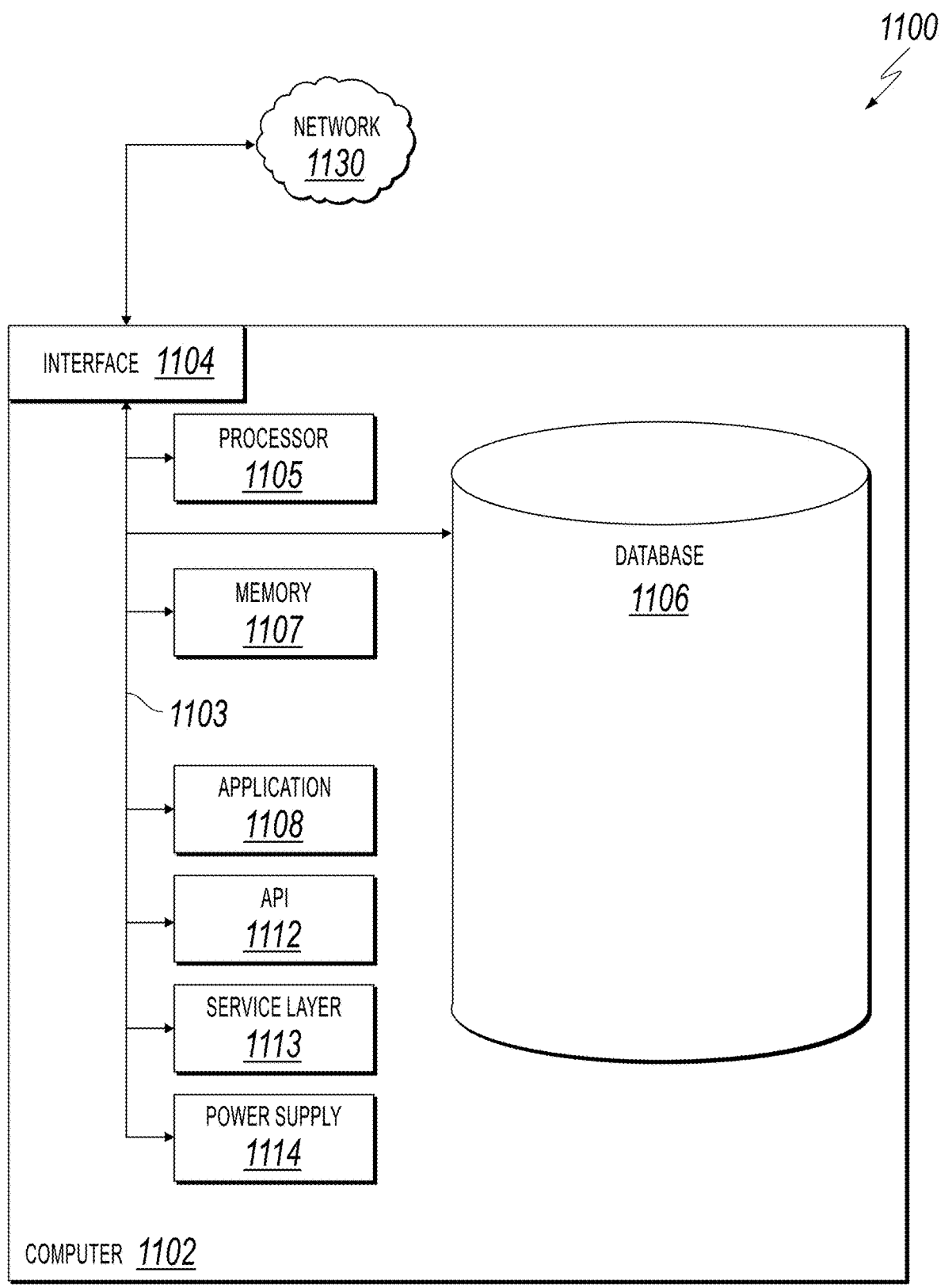
FIG. 11 is a block diagram of an exemplary computer system used to provide computational functionalities associated with described algorithms, methods, functions, processes, flows, and procedures as described in the instant disclosure, according to an implementation of the present disclosure.

FIG. 11 is a block diagram illustrating an example of a computer-implemented System 1100 used to provide computational functionalities associated with described algorithms, methods, functions, processes, flows, and procedures, according to an implementation of the present disclosure. In the illustrated implementation, System 1100 includes a Computer 1102 and a Network 1130.

The illustrated Computer 1102 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1102 can include an input device, such as a keypad, keyboard, touch screen, another input device, or a combination of input devices that can accept user information, and an output device that conveys information associated with the operation of the Computer 1102, including digital data, visual, audio, another type of information, or a combination of types of information, on a graphical-type user interface (UI) (or GUI) or other UI.

The Computer 1102 can serve in a role in a distributed computing system as a client, network component, a server, a database or another persistency, another role, or a combination of roles for performing the subject matter described in the present disclosure. The illustrated Computer 1102 is communicably coupled with a Network 1130. In some implementations, one or more components of the Computer 1102 can be configured to operate within an environment, including cloud-computing-based, local, global, another environment, or a combination of environments.

At a high level, the Computer 1102 is an electronic computing device operable to receive, transmit, process, store, or manage data and information associated with the described subject matter. According to some implementations, the Computer 1102 can also include or be communicably coupled with a server, including an application server, e-mail server, web server, caching server, streaming data server, another server, or a combination of servers.

The Computer 1102 can receive requests over Network 1130 (for example, from a client software application executing on another Computer 1102) and respond to the received requests by processing the received requests using a software application or a combination of software applications. In addition, requests can also be sent to the Computer 1102 from internal users (for example, from a command console or by another internal access method), external or third-parties, or other entities, individuals, systems, or computers.

Each of the components of the Computer 1102 can communicate using a System Bus 1103. In some implementations, any or all of the components of the Computer 1102, including hardware, software, or a combination of hardware and software, can interface over the System Bus 1103 using an application programming interface (API) 1112, a Service Layer 1113, or a combination of the API 1112 and Service Layer 1113. The API 1112 can include specifications for routines, data structures, and object classes. The API 1112 can be either computer-language independent or dependent and refer to a complete interface, a single function, or even a set of APIs. The Service Layer 1113 provides software services to the Computer 1102 or other components (whether illustrated or not) that are communicably coupled to the Computer 1102. The functionality of the Computer 1102 can be accessible for all service consumers using the Service Layer 1113. Software services, such as those provided by the Service Layer 1113, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1102, alternative implementations can illustrate the API 1112 or the Service Layer 1113 as stand-alone components in relation to other components of the Computer 1102 or other components (whether illustrated or not) that are communicably coupled to the Computer 1102. Moreover, any or all parts of the API 1112 or the Service Layer 1113 can be implemented as a child or a sub-module of another software module, enterprise application, or hardware module without departing from the scope of the present disclosure.

The Computer 1102 includes an Interface 1104. Although illustrated as a single Interface 1104, two or more Interfaces 1104 can be used according to particular needs, desires, or particular implementations of the Computer 1102. The Interface 1104 is used by the Computer 1102 for communicating with another computing system (whether illustrated or not) that is communicatively linked to the Network 1130 in a distributed environment. Generally, the Interface 1104 is operable to communicate with the Network 1130 and includes logic encoded in software, hardware, or a combination of software and hardware. More specifically, the Interface 1104 can include software supporting one or more communication protocols associated with communications such that the Network 1130 or hardware of Interface 1104 is operable to communicate physical signals within and outside of the illustrated Computer 1102.

The Computer 1102 includes a Processor 1105. Although illustrated as a single Processor 1105, two or more Processors 1105 can be used according to particular needs, desires, or particular implementations of the Computer 1102. Generally, the Processor 1105 executes instructions and manipulates data to perform the operations of the Computer 1102 and any algorithms, methods, functions, processes, flows, and procedures as described in the present disclosure.

The Computer 1102 also includes a Database 1106 that can hold data for the Computer 1102, another component communicatively linked to the Network 1130 (whether illustrated or not), or a combination of the Computer 1102 and another component. For example, Database 1106 can be an in-memory, conventional, or another type of database storing data consistent with the present disclosure. In some implementations, Database 1106 can be a combination of two or more different database types (for example, a hybrid in-memory and conventional database) according to particular needs, desires, or particular implementations of the Computer 1102 and the described functionality. Although illustrated as a single Database 1106, two or more databases of similar or differing types can be used according to particular needs, desires, or particular implementations of the Computer 1102 and the described functionality. While Database 1106 is illustrated as an integral component of the Computer 1102, in alternative implementations, Database 1106 can be external to the Computer 1102.

The Computer 1102 also includes a Memory 1107 that can hold data for the Computer 1102, another component or components communicatively linked to the Network 1130 (whether illustrated or not), or a combination of the Computer 1102 and another component. Memory 1107 can store any data consistent with the present disclosure. In some implementations, Memory 1107 can be a combination of two or more different types of memory (for example, a combination of semiconductor and magnetic storage) according to particular needs, desires, or particular implementations of the Computer 1102 and the described functionality. Although illustrated as a single Memory 1107, two or more Memories 1107 or similar or differing types can be used according to particular needs, desires, or particular implementations of the Computer 1102 and the described functionality. While Memory 1107 is illustrated as an integral component of the Computer 1102, in alternative implementations, Memory 1107 can be external to the Computer 1102.

The Application 1108 is an algorithmic software engine providing functionality according to particular needs, desires, or particular implementations of the Computer 1102, particularly with respect to functionality described in the present disclosure. For example, Application 1108 can serve as one or more components, modules, or applications. Further, although illustrated as a single Application 1108, the Application 1108 can be implemented as multiple Applications 1108 on the Computer 1102. In addition, although illustrated as integral to the Computer 1102, in alternative implementations, the Application 1108 can be external to the Computer 1102.

The Computer 1102 can also include a Power Supply 1114. The Power Supply 1114 can include a rechargeable or non-rechargeable battery that can be configured to be either user- or non-user-replaceable. In some implementations, the Power Supply 1114 can include power-conversion or management circuits (including recharging, standby, or another power management functionality). In some implementations, the Power Supply 1114 can include a power plug to allow the Computer 1102 to be plugged into a wall socket or another power source to, for example, power the Computer 1102 or recharge a rechargeable battery.

There can be any number of Computers 1102 associated with, or external to, a computer system containing Computer 1102, each Computer 1102 communicating over Network 1130. Further, the term "client," "user," or other appropriate terminology can be used interchangeably, as appropriate, without departing from the scope of the present disclosure. Moreover, the present disclosure contemplates that many users can use one Computer 1102, or that one user can use multiple computers 1102.

In typical implementations, the computational equipment needed to execute the described methodology depends on the data volume to be worked with. For example, if seismic data is less than 100 GB, a desktop or laptop computer is sufficient to execute that methodology. However, if the amount of seismic data is large (for example 1 TB), super-computing resources are preferred to enhance computation performance.

Described implementations of the subject matter can include one or more features, alone or in combination.

For example, in a first implementation, a computer-implemented method, comprising: receiving seismic shot gather data from a computer data store for processing; separating the received seismic shot gather data into downgoing and upgoing wavefields, wherein a time-frequency-wavenumber (t-f-k) three-dimensional (3D) data cube is formed, and wherein the t-f-k 3D data cube comprises multiple time-frequency (t-f) slices; wavelet transforming the downgoing wavefields from a time (t) domain to a t-f domain and the upgoing wavefields from the t domain to the t-f domain; performing, by operation of a computer, a wavelet cross-correlation between the downgoing wavefields in the t-f domain and the upgoing wavefields in a t-f-k domain to generate wavelet cross-correlated data; performing soft-threshold filtering for each t-f slice of the t-f-k 3D data cube; performing an inverse wavelet transform to bring wavelet cross-correlated data from the t-f-k domain to a time-receiver (t-x) domain; and looping over all seismic shots of the received seismic shot gather data and stacking the wavelet cross-correlated data as a virtual source gather.

The foregoing and other described implementations can each optionally include one or more of the following features:

A first feature, combinable with any of the following features, further comprising using adaptive summation or subtraction to perform the separation of the received seismic shot gather data.

A second feature, combinable with any of the previous or following features, wherein separating the received seismic shot gather data into downgoing wavefields further comprises time gating the downgoing wavefields to isolate direct early arrival wavefields from the downgoing wavefields.

A third feature, combinable with any of the previous or following features, wherein separating the received seismic shot gather data into upgoing wavefields further comprises removing ground-roll noise using a frequency-wavenumber (f-k) filter to generate f-k filtered upgoing wavefield data.

A fourth feature, combinable with any of the previous or following features, further comprising: preconditioning the wavelet transformed upgoing wavefield data to ensure smooth variations along a time and frequency axis to generated preconditioned data; and gathering t-f data for each receiver within an operating shot record from the preconditioned data.

A fifth feature, combinable with any of the previous or following features, further comprising Fourier-transforming the gathered t-f data over a spatial axis to a wavenumber (k) axis to form the t-f-k 3D data cube.

A sixth feature, combinable with any of the previous or following features, further comprising preconditioning the t-f-k 3D data cube to ensure smooth variations along the k axis.

In a second implementation, a non-transitory, computer-readable medium storing one or more instructions executable by a computer system to perform operations comprising: receiving seismic shot gather data from a data store for processing; separating the received seismic shot gather data into downgoing and upgoing wavefields, wherein a time-frequency-wavenumber (t-f-k) three-dimensional (3D) data cube is formed, and wherein the t-f-k 3D data cube comprises multiple time-frequency (t-f) slices; wavelet transforming the downgoing wavefields from a time (t) domain to a t-f domain and the upgoing wavefields from the t domain to the t-f domain; performing a wavelet cross-correlation between the downgoing wavefields in the t-f domain and the upgoing wavefields in a t-f-k domain to generate wavelet cross-correlated data; performing soft-threshold filtering for each t-f slice of the t-f-k 3D data cube; performing an inverse wavelet transform to bring wavelet cross-correlated data from the t-f-k domain to a time-receiver (t-x) domain; and looping over all seismic shots of the received seismic shot gather data and stacking the wavelet cross-correlated data as a virtual source gather.

The foregoing and other described implementations can each optionally include one or more of the following features:

A first feature, combinable with any of the following features, comprising one or more instructions to use adaptive summation or subtraction to perform the separation of the received seismic shot gather data.

A second feature, combinable with any of the previous or following features, wherein separating the received seismic shot gather data into downgoing wavefields further comprises one or more instructions to time gate the downgoing wavefields to isolate direct early arrival wavefields from the downgoing wavefields.

A third feature, combinable with any of the previous or following features, wherein separating the received seismic shot gather data into upgoing wavefields further comprises one or more instructions to remove ground-roll noise using a frequency-wavenumber (f-k) filter to generate f-k filtered upgoing wavefield data.

A fourth feature, combinable with any of the previous or following features, comprising one or more instructions to: precondition the wavelet transformed upgoing wavefield data to ensure smooth variations along a time and frequency axis to generated preconditioned data; and gather t-f data for each receiver within an operating shot record from the preconditioned data.

A fifth feature, combinable with any of the previous or following features, comprising one or more instructions to Fourier-transform the gathered t-f data over a spatial axis to a wavenumber (k) axis to form the t-f-k 3D data cube.

A sixth feature, combinable with any of the previous or following features, comprising one or more instructions to precondition the t-f-k 3D data cube to ensure smooth variations along the k axis.

In a third implementation, a computer-implemented system, comprising: a computer memory; and a hardware processor interoperably coupled with the computer memory and configured to perform operations comprising: receiving seismic shot gather data from a data store for processing; separating the received seismic shot gather data into downgoing and upgoing wavefields, wherein a time-frequency-wavenumber (t-f-k) three-dimensional (3D) data cube is formed, and wherein the t-f-k 3D data cube comprises multiple time-frequency (t-f) slices; wavelet transforming the downgoing wavefields from a time (t) domain to a t-f domain and the upgoing wavefields from the t domain to the t-f domain; performing a wavelet cross-correlation between the downgoing wavefields in the t-f domain and the upgoing wavefields in a t-f-k domain to generate wavelet cross-correlated data; performing soft-threshold filtering for each t-f slice of the t-f-k 3D data cube; performing an inverse wavelet transform to bring wavelet cross-correlated data from the t-f-k domain to a time-receiver (t-x) domain; and looping over all seismic shots of the received seismic shot gather data and stacking the wavelet cross-correlated data as a virtual source gather.

The foregoing and other described implementations can each optionally include one or more of the following features:

A first feature, combinable with any of the following features, further configured to use adaptive summation or subtraction to perform the separation of the received seismic shot gather data.

A second feature, combinable with any of the previous or following features, wherein separating the received seismic shot gather data into downgoing wavefields is further configured to time gate the downgoing wavefields to isolate direct early arrival wavefields from the downgoing wavefields.

A third feature, combinable with any of the previous or following features, wherein separating the received seismic shot gather data into upgoing wavefields is further configured to remove ground-roll noise using a frequency-wavenumber (f-k) filter to generate f-k filtered upgoing wavefield data.

A fourth feature, combinable with any of the previous or following features, further configured to: precondition the wavelet transformed upgoing wavefield data to ensure smooth variations along a time and frequency axis to generated preconditioned data; and gather t-f data for each receiver within an operating shot record from the preconditioned data.

A fifth feature, combinable with any of the previous or following features, further configured to Fourier-transform the gathered t-f data over a spatial axis to a wavenumber (k) axis to form the t-f-k 3D data cube.

A sixth feature, combinable with any of the previous or following features, further configured to precondition the t-f-k 3D data cube to ensure smooth variations along the k axis.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
receiving seismic shot gather data of a subsurface area from a computer data store for processing;
separating the received seismic shot gather data into downgoing and upgoing wavefields, wherein a time-frequency-wavenumber (t-f-k) three-dimensional (3D)

data cube is formed, and wherein the t-f-k 3D data cube comprises multiple time-frequency (t-f) slices;

wavelet transforming the downgoing wavefields from a time (t) domain to a t-f domain and the upgoing wavefields from the t domain to the t-f domain;

performing, by operation of a computer, a wavelet cross-correlation between the downgoing wavefields in the t-f domain and the upgoing wavefields in a t-f-k domain to generate wavelet cross-correlated data;

performing soft-threshold filtering for each t-f slice of the t-f-k 3D data cube;

performing an inverse wavelet transform to bring wavelet cross-correlated data from the t-f-k domain to a time-receiver (t-x) domain;

looping over all seismic shots of the received seismic shot gather data and stacking the wavelet cross-correlated data as a virtual source gather; and generating an image of the subsurface area based on the virtual source gather.

2. The computer-implemented method of claim 1, further comprising using adaptive summation or subtraction to perform the separation of the received seismic shot gather data.

3. The computer-implemented method of claim 1, wherein separating the received seismic shot gather data into downgoing wavefields further comprises time gating the downgoing wavefields to isolate direct early arrival wavefields from the downgoing wavefields.

4. The computer-implemented method of claim 1, wherein separating the received seismic shot gather data into upgoing wavefields further comprises removing ground-roll noise using a frequency-wavenumber (f-k) filter to generate f-k filtered upgoing wavefield data.

5. The computer-implemented method of claim 4, further comprising:
preconditioning the wavelet transformed upgoing wavefield data to ensure smooth variations along a time and frequency axis to generated preconditioned data; and
gathering t-f data for each receiver within an operating shot record from the preconditioned data.

6. The computer-implemented method of claim 5, further comprising Fourier-transforming the gathered t-f data over a spatial axis to a wavenumber (k) axis to form the t-f-k 3D data cube.

7. The computer-implemented method of claim 6, further comprising preconditioning the t-f-k 3D data cube to ensure smooth variations along the k axis.

8. A non-transitory, computer-readable medium storing one or more instructions executable by a computer system to perform operations comprising:
receiving seismic shot gather data of a subsurface area from a data store for processing;
separating the received seismic shot gather data into downgoing and upgoing wavefields, wherein a time-frequency-wavenumber (t-f-k) three-dimensional (3D) data cube is formed, and wherein the t-f-k 3D data cube comprises multiple time-frequency (t-f) slices;
wavelet transforming the downgoing wavefields from a time (t) domain to a t-f domain and the upgoing wavefields from the t domain to the t-f domain;
performing a wavelet cross-correlation between the downgoing wavefields in the t-f domain and the upgoing wavefields in a t-f-k domain to generate wavelet cross-correlated data;
performing soft-threshold filtering for each t-f slice of the t-f-k 3D data cube;
performing an inverse wavelet transform to bring wavelet cross-correlated data from the t-f-k domain to a time-receiver (t-x) domain;
looping over all seismic shots of the received seismic shot gather data and stacking the wavelet cross-correlated data as a virtual source gather; and
generating an image of the subsurface area based on the virtual source gather.

9. The non-transitory, computer-readable medium of claim 8, comprising one or more instructions to use adaptive summation or subtraction to perform the separation of the received seismic shot gather data.

10. The non-transitory, computer-readable medium of claim 8, wherein separating the received seismic shot gather data into downgoing wavefields further comprises one or more instructions to time gate the downgoing wavefields to isolate direct early arrival wavefields from the downgoing wavefields.

11. The non-transitory, computer-readable medium of claim 8, wherein separating the received seismic shot gather data into upgoing wavefields further comprises one or more instructions to remove ground-roll noise using a frequency-wavenumber (f-k) filter to generate f-k filtered upgoing wavefield data.

12. The non-transitory, computer-readable medium of claim 11, comprising one or more instructions to:
precondition the wavelet transformed upgoing wavefield data to ensure smooth variations along a time and frequency axis to generated preconditioned data; and
gather t-f data for each receiver within an operating shot record from the preconditioned data.

13. The non-transitory, computer-readable medium of claim 12, comprising one or more instructions to Fourier-transform the gathered t-f data over a spatial axis to a wavenumber (k) axis to form the t-f-k 3D data cube.

14. The non-transitory, computer-readable medium of claim 13, comprising one or more instructions to precondition the t-f-k 3D data cube to ensure smooth variations along the k axis.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving seismic shot gather data of a subsurface area from a data store for processing;
separating the received seismic shot gather data into downgoing and upgoing wavefields, wherein a time-frequency-wavenumber (t-f-k) three-dimensional (3D) data cube is formed, and wherein the t-f-k 3D data cube comprises multiple time-frequency (t-f) slices;
wavelet transforming the downgoing wavefields from a time (t) domain to a t-f domain and the upgoing wavefields from the t domain to the t-f domain;
performing a wavelet cross-correlation between the downgoing wavefields in the t-f domain and the upgoing wavefields in a t-f-k domain to generate wavelet cross-correlated data;
performing soft-threshold filtering for each t-f slice of the t-f-k 3D data cube;
performing an inverse wavelet transform to bring wavelet cross-correlated data from the t-f-k domain to a time-receiver (t-x) domain;

looping over all seismic shots of the received seismic shot gather data and stacking the wavelet cross-correlated data as a virtual source gather; and generating an image of the subsurface area based on the virtual source gather.

16. The computer-implemented system of claim 15, further configured to use adaptive summation or subtraction to perform the separation of the received seismic shot gather data.

17. The computer-implemented system of claim 15, wherein separating the received seismic shot gather data into downgoing wavefields is further configured to time gate the downgoing wavefields to isolate direct early arrival wavefields from the downgoing wavefields.

18. The computer-implemented system of claim 15, wherein separating the received seismic shot gather data into upgoing wavefields is further configured to remove ground-roll noise using a frequency-wavenumber (f-k) filter to generate f-k filtered upgoing wavefield data.

19. The computer-implemented system of claim 18, further configured to:
precondition the wavelet transformed upgoing wavefield data to ensure smooth variations along a time and frequency axis to generated preconditioned data; and
gather t-f data for each receiver within an operating shot record from the preconditioned data.

20. The computer-implemented system of claim 19, further configured to:
Fourier-transform the gathered t-f data over a spatial axis to a wavenumber (k) axis to form the t-f-k 3D data cube; and
precondition the t-f-k 3D data cube to ensure smooth variations along the k axis.

* * * * *